(12) United States Patent
Cihan et al.

(10) Patent No.: US 11,692,809 B2
(45) Date of Patent: Jul. 4, 2023

(54) SELF-MIXING INTERFEROMETRY-BASED ABSOLUTE DISTANCE MEASUREMENT WITH DISTANCE REFERENCE

(71) Applicant: Apple Inc., Cupertino, CA (US)

(72) Inventors: Ahmet Fatih Cihan, San Jose, CA (US); Mehmet Mutlu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 521 days.

(21) Appl. No.: 16/945,573

(22) Filed: Jul. 31, 2020

(65) Prior Publication Data

US 2021/0080248 A1     Mar. 18, 2021

Related U.S. Application Data

(60) Provisional application No. 62/902,268, filed on Sep. 18, 2019.

(51) Int. Cl.
*G01P 3/36*       (2006.01)
*G01B 9/02*       (2022.01)
(Continued)

(52) U.S. Cl.
CPC .......... *G01B 9/02092* (2013.01); *G01P 5/26* (2013.01); *G01S 17/58* (2013.01)

(58) Field of Classification Search
None
See application file for complete search history.

(56) References Cited

U.S. PATENT DOCUMENTS

| | | | |
|---|---|---|---|
| 4,402,601 | A | 9/1983 | Riva |
| 4,657,382 | A | 4/1987 | Busujima et al. |

(Continued)

FOREIGN PATENT DOCUMENTS

| | | |
|---|---|---|
| CN | 2163384 | 4/1994 |
| CN | 1279394 | 1/2001 |

(Continued)

OTHER PUBLICATIONS

Author Unknown, "Biometric Technology Market Foresees Growth Due to Innovative Advancement," https://menafn.com/mf_contact.aspx?src=Contact_Authors, Dec. 18, 2020, 2 pages.

(Continued)

*Primary Examiner* — Mark Hellner
(74) *Attorney, Agent, or Firm* — Brownstein Hyatt Farber Schreck, LLP

(57) ABSTRACT

A device includes a first component, a second component having a reconfigurable distance from the first component, an optical element, an SMI sensor, and a processor. The optical element has a fixed relationship with respect to the first component, and has a known optical thickness between a first surface and a second surface of the optical element. The SMI sensor has a fixed relationship with respect to the second component, and has an electromagnetic radiation emission axis that intersects the first and second surfaces of the optical element. The processor is configured to identify disturbances in an SMI signal generated by the SMI sensor, relate the disturbances to the known optical thickness of the optical element, and to determine a distance between the first and second components using the SMI signal and the relationship of the disturbances to the known optical thickness of the optical element.

20 Claims, 22 Drawing Sheets

(51) Int. Cl.
*G01P 5/26* (2006.01)
*G01S 17/58* (2006.01)

(56) References Cited

U.S. PATENT DOCUMENTS

| | | |
|---|---|---|
| 5,748,295 A | 5/1998 | Farmer |
| 5,825,465 A | 10/1998 | Nerin et al. |
| 6,233,045 B1 | 5/2001 | Suni et al. |
| 6,794,671 B2 | 9/2004 | Nicoli et al. |
| 7,227,180 B2 | 10/2007 | Townley-Smith et al. |
| 7,388,672 B2 | 6/2008 | Zhou et al. |
| 7,619,744 B2 | 11/2009 | Liess |
| 7,990,521 B2 | 8/2011 | Ueno |
| 7,995,193 B2 | 8/2011 | Kuwata |
| 8,339,584 B2 | 12/2012 | Christian et al. |
| 8,416,424 B2 | 4/2013 | Werner et al. |
| 8,532,751 B2 | 9/2013 | McKenna |
| 8,625,099 B2 | 1/2014 | Sakamoto et al. |
| 8,820,147 B2 | 9/2014 | Sinha |
| 8,982,336 B2 | 3/2015 | Ueno |
| 9,229,024 B2 | 1/2016 | Carpaij et al. |
| 9,354,315 B2 | 5/2016 | Lepaysan et al. |
| 9,397,476 B2 | 7/2016 | Baier et al. |
| 9,726,474 B2 | 8/2017 | Royo Royo et al. |
| 9,759,736 B2 | 9/2017 | Zamama et al. |
| 9,778,177 B2 | 10/2017 | Roke et al. |
| 10,180,397 B2 | 1/2019 | Rakic et al. |
| 10,379,028 B2 | 8/2019 | Spruit et al. |
| 10,390,730 B1 | 8/2019 | Shoeb |
| 10,503,048 B2 | 12/2019 | Del Bino et al. |
| 11,054,244 B2 | 7/2021 | Ouweltjes et al. |
| 11,119,021 B2 | 9/2021 | Spruit et al. |
| 11,187,643 B2 | 11/2021 | Jutte et al. |
| 11,243,068 B1 | 2/2022 | Mutlu et al. |
| 11,409,365 B2 | 8/2022 | Mutlu et al. |
| 11,419,546 B2 | 8/2022 | Cihan et al. |
| 11,450,293 B2 | 10/2022 | Chen et al. |
| 2012/0002189 A1 | 1/2012 | Bengoechea Apezteguia et al. |
| 2019/0285537 A1 | 9/2019 | Spruit et al. |
| 2019/0285753 A1 | 9/2019 | Spruit et al. |
| 2020/0072723 A1 | 3/2020 | Weiss et al. |
| 2020/0318945 A1 | 10/2020 | Mutlu et al. |
| 2020/0319082 A1 | 10/2020 | Mutlu et al. |
| 2020/0337631 A1 | 10/2020 | Sahin |
| 2020/0350744 A1 * | 11/2020 | Gerlach ............. H01S 5/18361 |
| 2020/0370879 A1 | 11/2020 | Mutlu et al. |
| 2021/0010797 A1 | 1/2021 | Cihan et al. |
| 2021/0302745 A1 | 9/2021 | Mutlu et al. |
| 2021/0364273 A1 | 11/2021 | Mutlu et al. |
| 2022/0099431 A1 | 3/2022 | Chen et al. |

FOREIGN PATENT DOCUMENTS

| | | | |
|---|---|---|---|
| CN | 1682105 | 10/2005 | |
| CN | 102564909 | 7/2012 | |
| CN | 103733061 | 4/2014 | |
| CN | 106226783 | 12/2016 | |
| CN | 207231962 | 4/2018 | |
| CN | 109154659 | 1/2019 | |
| CN | 108692663 | 4/2020 | |
| DE | 102016210830 A1 * | 12/2017 | ......... G01B 9/02021 |
| EP | 3514898 A1 * | 7/2019 | ......... H01S 5/18341 |
| JP | H06331745 | 12/1994 | |
| WO | WO 10/058322 | 5/2010 | |
| WO | WO 14/086375 | 6/2014 | |
| WO | WO 17/198699 | 11/2017 | |
| WO | WO 18/104153 | 6/2018 | |
| WO | WO 18/104154 | 6/2018 | |
| WO | WO 18/206474 | 11/2018 | |
| WO | WO 20/207908 | 10/2020 | |
| WO | WO 21/257737 | 12/2021 | |

OTHER PUBLICATIONS

U.S. Appl. No. 16/833,199, filed Mar. 27, 2020, Mutlu et al.
U.S. Appl. No. 16/833,271, filed Mar. 27, 2020, Mutlu et al.
Guiliani et al., "Laser diode self-mixing technique for sensing applications," Journal of Optics A: Pure and Applied Optics, 2002, S283-S294.

* cited by examiner

SELF-MIXING INTERFEROMETRY-BASED ABSOLUTE DISTANCE MEASUREMENT WITH DISTANCE REFERENCE

CROSS-REFERENCE TO RELATED APPLICATION

This application is a nonprovisional and claims the benefit under 35 U.S.C. § 119(e) of U.S. Provisional Patent Application No. 62/902,268, filed Sep. 18, 2019, the contents of which are hereby incorporated by reference as if fully disclosed herein.

FIELD

The described embodiments generally relate to devices that include one or more self-mixing interferometry (SMI) sensors and, more particularly, to devices that use a distance reference when measuring absolute distance using an SMI sensor.

BACKGROUND

Sensor systems are included in many of today's electronic devices, including electronic devices such as smartphones, computers (e.g., tablet computers or laptop computers), wearable electronic devices (e.g., electronic watches or health monitors), game controllers, navigation systems (e.g., vehicle navigation systems or robot navigation systems), and so on. Sensor systems may variously sense the presence of objects, distances to objects or proximities of objects, movements of objects (e.g., whether objects are moving, or the speed, acceleration, or direction of movement of objects), and so on.

Given the wide range of sensor system applications, any new development in the configuration or operation of a sensor system can be useful. New developments that may be particularly useful are developments that reduce the cost, size, complexity, part count, or manufacture time of the sensor system, or developments that improve the sensitivity or speed of sensor system operation, or developments that enable new functionality or applications.

SUMMARY

Embodiments of the systems, devices, methods, and apparatus described in the present disclosure are directed to use a distance reference when measuring the absolute distance between two objects using an SMI sensor. The distance reference (e.g., an optical element, such as an optical film) may have a fixed relationship with one of the objects (or may be one of the objects), and the SMI sensor may have a fixed relationship with the other of the objects (or may be one of the objects).

An SMI sensor is defined herein as a sensor configured to generate electromagnetic radiation (e.g., light), emit the electromagnetic radiation from a resonant cavity (e.g., a resonant optical cavity), receive a reflection or backscatter of the electromagnetic radiation (e.g., electromagnetic radiation reflected or backscattered from a surface, or an object having a surface (collectively referred to herein as a surface)) back into the resonant cavity, coherently or partially coherently self-mix the generated and reflected/backscattered electromagnetic radiation within the resonant cavity, and produce an output indicative of the self-mixing (i.e., an SMI signal). The generated, emitted, and received electromagnetic radiation may be coherent or partially coherent. In some examples, the electromagnetic radiation emitted by an SMI sensor may be generated by an electromagnetic radiation source such as a vertical-cavity surface-emitting laser (VCSEL), a vertical external-cavity surface-emitting laser (VECSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge-emitting LED), and so on. The generated, emitted, and received electromagnetic radiation may include, for example, visible or invisible light (e.g., green light, infrared (IR) light, ultraviolet (UV) light, and so on). The output of an SMI sensor (i.e., an SMI signal) may include a photocurrent produced by a photodetector (e.g., a photodiode), which photodetector is integrated with, or positioned under, above, or next to, the sensor's electromagnetic radiation source. Alternatively or additionally, the output of an SMI sensor may include a measurement of the current or junction voltage of the SMI sensor's electromagnetic radiation source. The recoupling of reflected electromagnetic radiation, back into the resonant cavity of an SMI sensor, produces disturbances in the SMI signal, which disturbances can be measured and analyzed to determine, for example, the displacement, velocity, and/or absolute distance of a target.

In a first aspect, the present disclosure describes a device. The device may include a frame, an optical element attached to the frame, an SMI sensor attached to the frame, and a processor. The optical element may have a known optical thickness between a first surface and a second surface of the optical element. The SMI sensor may be configured to emit a modulated beam of electromagnetic radiation toward the first surface of the optical element and generate an SMI signal containing disturbances caused by reflections or backscatters of the beam from the first surface and the second surface. The processor may be configured to relate the disturbances to the known optical thickness of the optical element, and to determine a distance between two objects using the SMI signal and the relationship of the disturbances to the known optical thickness of the optical element.

In another aspect of the disclosure, the present disclosure describes another device. The device includes a first component, a second component having a reconfigurable distance from the first component, an optical element, an SMI sensor, and a processor. The optical element may have a fixed relationship with respect to the first component, and may have a known optical thickness between a first surface and a second surface of the optical element. The SMI sensor may have a fixed relationship with respect to the second component, and may have an electromagnetic radiation emission axis that intersects the first and second surfaces of the optical element. The processor may be configured to identify disturbances in an SMI signal generated by the SMI sensor; relate the disturbances to the known optical thickness of the optical element; and determine a distance between the first and second components using the SMI signal and the relationship of the disturbances to the known optical thickness of the optical element.

In another aspect, the present disclosure describes a method of determining a distance between a first object and a second object. The method includes emitting a beam of electromagnetic radiation from an SMI sensor having a fixed relationship with respect to the first object; receiving, from the SMI sensor, an SMI signal containing disturbances caused by reflections or backscatters of the beam from first and second surfaces of an optical element having a fixed relationship with respect to the second object; relating the disturbances to a known optical thickness of the optical element; and determining a distance between the first object and the second object, using the SMI signal and the relationship of the disturbances to the known optical thickness of the optical element.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
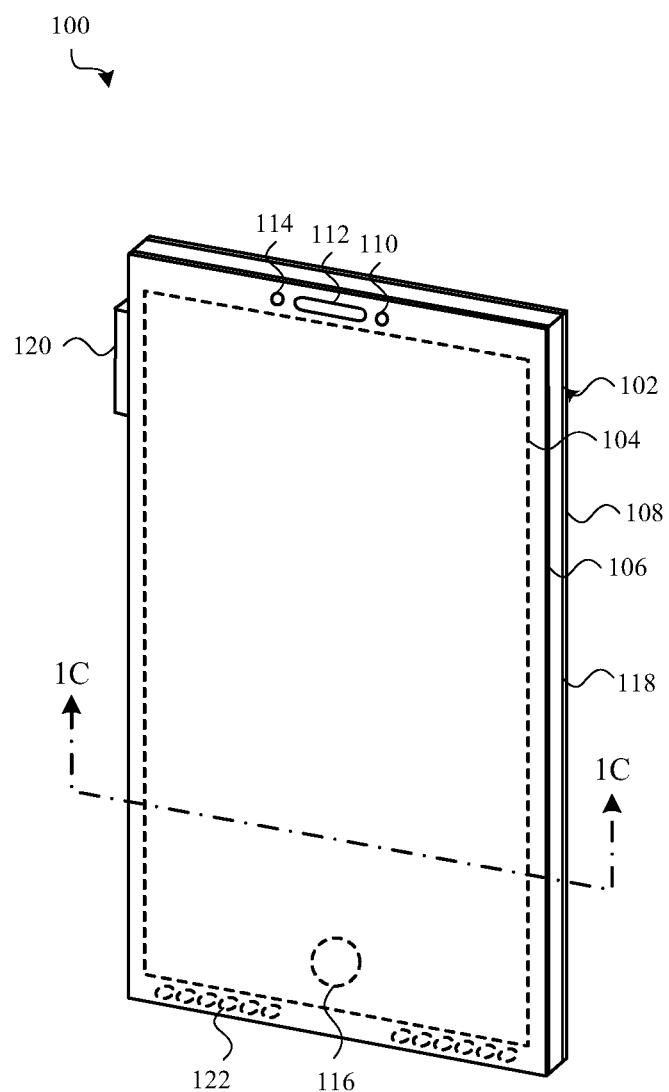
FIGS. 1A-1C show an example of a device that includes an SMI-based absolute distance measurement system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following description relates to systems, devices, methods, and apparatus that use a distance reference when measuring the absolute distance between two objects using an SMI sensor.

Self-mixing interferometry is an optical sensing technology that can be used to measure the displacement of a target with sub-wavelength resolution. By relating displacement measurement to measurement times, a velocity of a target can also be measured. In addition, by inducing a known wavelength modulation (e.g., a triangular modulation) into a beam of electromagnetic radiation emitted by an SMI sensor, the absolute distance between two objects can also be measured (e.g., with 0.1 millimeter (mm) or better resolution).

In some cases, the absolute distance between an SMI sensor and an object may be measured by triangularly modulating a beam of electromagnetic radiation emitted by the SMI sensor (e.g., by triangularly modulating the current of the SMI sensor's emitter). In such cases, the absolute distance between the SMI sensor and object may be determined using the following equation:

$$\text{Absolute Distance} = \frac{1}{4f_{triangle}} \frac{\lambda^2}{\Delta\lambda} f_{peak} = Cf_{peak}$$

where $\lambda$ is the wavelength of the electromagnetic radiation generated by the SMI sensor; $f_{triangle}$ is the frequency of the triangular modulation; $\Delta\lambda$, is the wavelength modulation range induced by the wavelength modulation method (e.g., current modulation of the electromagnetic radiation source); and $f_{peak}$ is the peak frequency of the SMI signal's FFT spectra.

Unfortunately, there are a number of error sources in the above absolute distance measurement. For example, $\Delta\lambda$, can vary by >15% due to temperature change and/or degradation of the SMI sensor's light source (e.g., laser) over the lifetime of the SMI sensor. A can vary by >1% due to temperature change and/or degradation of the SMI sensor's light source (e.g., laser) over the lifetime of the SMI sensor. $f_{triangle}$ can vary by <0.001% due to temperature change and/or other factors affecting the stability of electronic components over the lifetime of the SMI sensor. $f_{peak}$ can vary based on the signal-to-noise ratio (SNR) and FFT integration time.

As a result of the above error sources, SMI-based absolute distance measurement can be poor (>15% error). The main error source is the change in peak-to-peak wavelength modulation with changes in temperature and SMI sensor degradation over time. Some tracking applications may require more accuracy (e.g., ±50 micrometer (μm) over 10 mm). In such an application, error due to SMI-based error sources can be greater than 1.5 mm, and SMI-based absolute distance measurement may not be suitable. In other words, SMI-based absolute distance measurement may be associated with a measurement error in excess of 15% when the required accuracy is less than 0.5% error.

Described herein are systems, devices, methods, and apparatus that use a distance reference to enable SMI-based absolute distance measurement with better accuracy. The distance reference is an optical element (e.g., an optical film, substrate, or block of material) having a known optical thickness (i.e., a known physical thickness times a known refractive index, each of which is known with high precision). The material used to form the optical element should have a well-defined and low thermal expansion coefficient, and in some cases may be glass, sapphire, or silicon. The optical element may in some cases be manufactured with less accuracy, but measured with high accuracy before integration into a sensing system. Alternatively, the optical element may be manufactured with high accuracy.

When a beam of electromagnetic radiation is emitted toward the optical element (e.g., perpendicular to first and second surfaces separated by a known optical distance (or optical thickness)), the electromagnetic radiation will reflect or backscatter from the first and second surfaces at two distinct frequencies in an SMI signal's FFT spectra. The difference between these frequencies may be considered a reference frequency. The ratio of the known optical thickness of the optical element to the reference frequency provides a high accuracy estimate of the coefficient, C, in the above absolute distance measurement equation (e.g., a known optical thickness of 2 mm is related to a measured frequency difference of 22 kHz-20 kHz (or 2 kHz). In some embodiments, C may be measured during every measurement frame, providing high accuracy SMI-based absolute distance measurement without needing to know, measure, or estimate any of $\lambda$, $\Delta\lambda$, or $f_{triangle}$. In such an approach, the factors that limit the accuracy of the SMI-based absolute distance measurement are no longer wavelength-dependent, but are instead dependent on the material properties and calibration (e.g., optical thickness measurement) of the distance reference, and their stability under different environmental conditions and throughout the lifetime of the sensor system. Factors for selecting and calibrating a distance reference (e.g., a distance reference made of glass, sapphire, silicon, or other materials), with high accuracy, are well-known.

These and other techniques are described with reference to FIGS. 1A-17. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "beneath", "left", "right", etc. may be used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

Figure 1B:
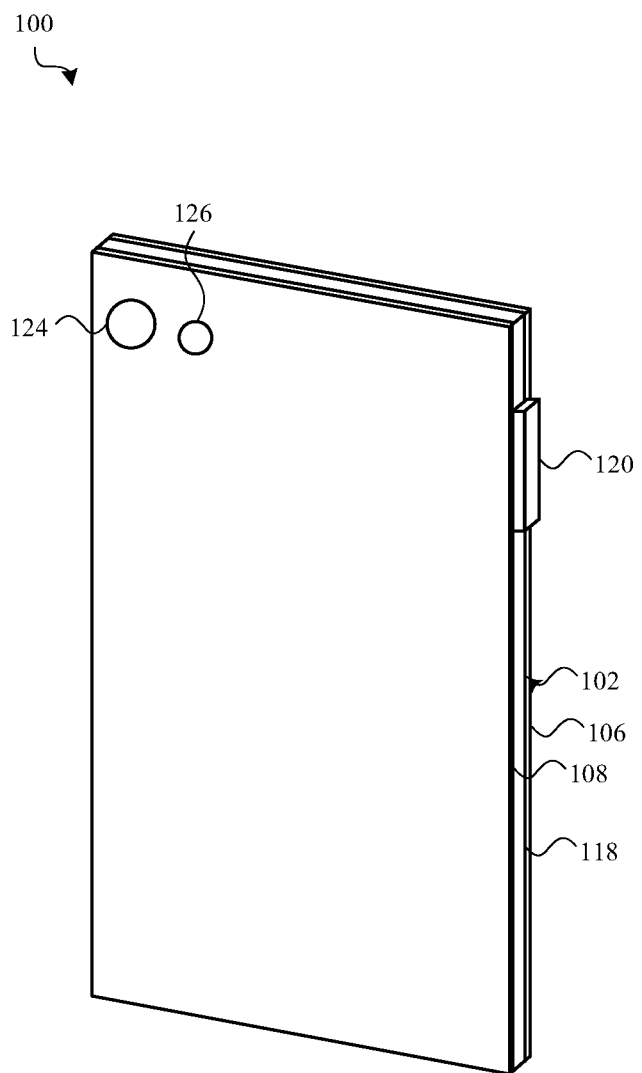
Figure 1C:
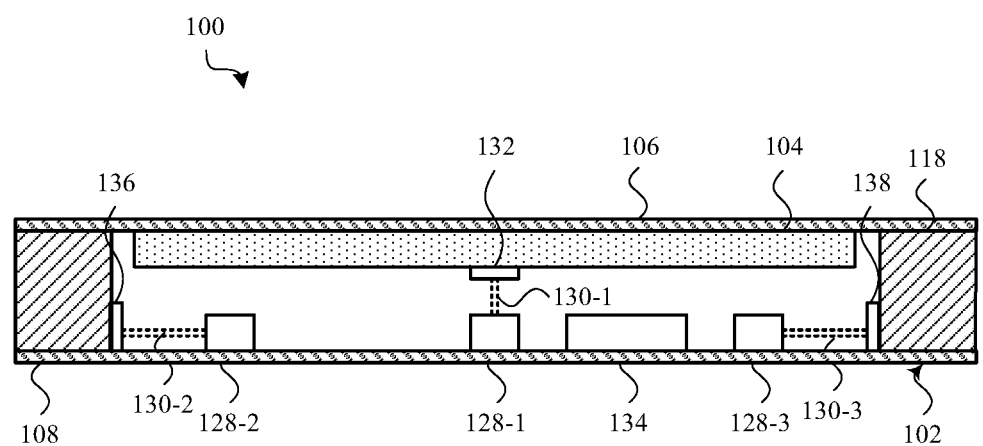

FIGS. 1A-1C show an example of a device 100 that includes an SMI-based absolute distance measurement system. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example, a mobile phone, tablet computer, portable computer, portable music player, health monitor device, portable terminal, vehicle navigation system, robot navigation system, gaming device, virtual reality (VR), augmented reality (AR), or mixed reality (MR) device, or other portable or mobile device. The device 100 could also be a device that is semi-permanently located (or installed) at a single location. FIG. 1A shows a front isometric view of the device 100, FIG. 1B shows a rear isometric view of the device 100, and FIG. 1C shows a cross-section of the device 100 along line 1C-1C in FIG. 1A. The device 100 may include a frame 102 that at least partially surrounds a display 104. The frame 102 may include or support a front cover 106 or a rear cover 108, and together with the front and/or rear covers 106, 108 may define a housing for the device 100. The front cover 106 may be positioned over the display 104, and may provide a window through which the display 104 may be viewed. In some embodiments, the display 104 may be attached to (or abut) the frame 102 and/or the front cover 106. In alternative embodiments of the device 100, the display 104 may not be included and/or the frame 102 may have an alternative configuration.

The display 104 may include one or more light-emitting elements including, for example, an LED, OLED, liquid crystal display (LCD), electroluminescent (EL) display, or other type of display element. In some embodiments, the display 104 may include, or be associated with, one or more touch and/or force sensors that are configured to detect a touch and/or a force applied to a surface of the front cover 106.

The various components of the frame 102 may be formed from the same or different materials. For example, a sidewall 118 of the frame 102 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the frame 102. The rear cover 108 may be formed using the same material(s) that are used to form the sidewall 118 or the front cover 106. Alternatively, the rear cover 108 may be formed using different materials. In some cases, the rear cover 108 may be part of a monolithic element that also forms the sidewall 118 (or in cases where the sidewall 118 is a multi-segment sidewall, those portions of the sidewall 118 that are non-conductive). In still other embodiments, all of the exterior components of the frame 102 may be formed from a transparent material, and components within the device 100 may or may not be obscured by an opaque ink or opaque structure within the frame 102.

The front cover 106 may be mounted to the frame 102 and/or sidewall 118 to cover an opening defined by the frame 102 and/or sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume below and/or to the side of the display 104 (and in some cases within the device stack). The force sensor (or force sensor system) may be triggered in response to the touch sensor detecting one or more touches on the front cover 106 (or a location or locations of one or more touches on the front cover 106), and may determine an amount of force associated with each touch, or an amount of force associated with the collection of touches as a whole. Alternatively, the force sensor (or force sensor system) may sense force independently of input from the touch sensor (or touch sensor system), or the force sensor (or force sensor system) may itself be operated as a touch sensor (or touch input system). In some embodiments, the force sensor may determine forces applied to the front cover 106 using the SMI-based distance, velocity, and motion sensing techniques described herein.

As shown primarily in FIG. 1A, the device 100 may include various other components. For example, the front of the device 100 may include one or more front-facing cameras 110, speakers 112, microphones, or other components 114 (e.g., audio, imaging, and/or sensing components) that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be accessible from the front surface (or display surface) of the device 100. In some cases, the front-facing camera 110, virtual button 116, and/or other sensors of the device 100 may be integrated with a display stack of the display 104 and moved under the display 104.

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter concentration sensor, or air quality sensor may be positioned in or near a port 122.

In some embodiments, the rear surface of the device 100 may include a rear-facing camera 124 or other optical sensor (see FIG. 1B). A flash or light source 126 may also be positioned along the rear of the device 100 (e.g., near the rear-facing camera). In some cases, the rear surface of the device 100 may include multiple rear-facing cameras.

The camera(s), microphone(s), pressure sensor(s), temperature sensor(s), biometric sensor(s), button(s), proximity sensor(s), touch sensor(s), force sensor(s), particulate matter or air quality sensor(s), and so on of the device 100 may form parts of various sensor systems. In some cases, a sensor system may perform best with a wide FoV or increased granularity (i.e., with a sensing field that includes multiple sensors). In these cases, a sensor system may include an array of sensors (e.g., a 1D or 2D array of sensors). For example, a bio-authentication sensor system may include a 2D array of sensors that emit and receive electromagnetic radiation (e.g., IR electromagnetic radiation). As another example, a presence-sensing sensor system may include a 1D or 2D array of sensors that emit and receive electromagnetic radiation.

FIG. 1C shows an example cross-section of the device 100. As shown, one or more SMI sensors 128 may be mounted within the device 100 (e.g., attached to the frame 102 of the device 100). A first optional SMI sensor 128-1 may be oriented so that a beam of electromagnetic radiation 130-1 emitted by the SMI sensor 128-1 impinges on the front cover 106, or on an optical element 132 (e.g., an optical film, substrate, or block of material) attached directly to an interior surface of the front cover 106 (e.g., to one side of a viewing surface of the display 104), or attached indirectly to the interior surface of the front cover 106 (e.g., by virtue of being attached to a display 104 or device stack attached to the interior surface of the front cover 106).

The SMI sensor 128-1 may have an electromagnetic radiation emission axis that is oriented perpendicular to the front cover 106. A processor 134 (e.g., a microprocessor, application-specific integrated circuit (ASIC), microcontroller, or set of integrated and/or discrete circuits) coupled to the SMI sensor 128-1 may modulate a wavelength of the beam of electromagnetic radiation (to produce a modulated beam); analyze samples of an SMI signal generated by the SMI sensor 128-1; and determine a distance between the SMI sensor 128-1 and the front cover 106 (or between the SMI sensor 128-1 and the optical element 132). Assuming the rear cover 108 of the device 100 has a fixed relationship with respect to the SMI sensor 128-1, and that the optical element 132 (if provided) has a fixed relationship with the front cover 106, the processor 134 may also determine a distance between the rear cover 108 and the front cover 106, between the rear cover 108 and the optical element 132, and so on. The distance(s) is/are determined by characterizing disturbances in the SMI signal generated by the SMI sensor 128-1, which disturbances are caused by reflections or backscatters of the beam of electromagnetic radiation 130-1 from first and second surfaces of the front cover 106 or optical element 132 (i.e., first and second surfaces that are oriented parallel to the viewing surface, or exterior surface, of the display 104); relating the disturbances to a known optical thickness of the front cover 106 or optical element (i.e., an optical thickness between the first and second surfaces of the front cover 106 or optical element 132); and determining the distance between the SMI sensor 128-1 and front cover 106 (or optical element 132) using the SMI signal and the relationship of the disturbances to the known optical thickness of the optical element 132, as described in more detail with reference to FIGS. 2-5. In some cases, relating the disturbances to the known optical thickness may include relating the disturbances to a known physical thickness of the optical element 132 using a known refractive index of the optical element 132 and/or other information (i.e., because the optical thickness of the optical element 132 is related to the physical thickness of the optical element 132 times the refractive index of the optical element 132). When a user presses on the front cover 106, a displacement, velocity, or other movement parameter of the front cover 106 may also be determined by the processor 134.

In some cases, the processor 134 may triangularly modulate a wavelength of the beam of electromagnetic radiation 130-1 (to produce a triangularly modulated beam) when determining the distance between the SMI sensor 128-1 and the front cover 106 (or optical element 132), but sinusoidally modulate a wavelength of the beam of electromagnetic radiation 130-1 (to produce a sinusoidally modulated beam) when monitoring for a user's touch or press on the front cover 106, or when otherwise monitoring the displacement, velocity, or other movement parameter of the front cover 106. A displacement of the front cover 106 may indicate that a force is being applied to the front cover 106, and an amount of the displacement may indicate an amount (or magnitude) of the force.

A second optional SMI sensor 128-2 may be oriented so that a beam of electromagnetic radiation 130-2 emitted by the SMI sensor 128-2 impinges on an optical element 136 (e.g., an optical film, substrate, or block of material) attached to the sidewall 118. The SMI sensor 128-2 may have an electromagnetic radiation emission axis that is oriented perpendicular to the sidewall 118. The processor 134 may modulate a wavelength of the beam of electromagnetic radiation 130-2 (to produce a modulated beam); analyze samples of an SMI signal generated by the SMI sensor 128-2; and determine a distance between the SMI sensor 128-2 and the optical element 136. The processor 134 may also determine a displacement, velocity, or other movement parameter of the sidewall 118 with respect to the SMI sensor 128-2.

In some embodiments, second and third optional SMI sensors 128-2, 128-3 may emit beams of electromagnetic radiation 130-2, 130-3 toward optical elements 136, 138 attached to opposing sidewall portions of the device 100. In some cases, the processor 134 may analyze SMI signals generated by the second and/or third SMI sensors 128-2, 128-3 to determine whether, or how hard, a user is gripping the device 100.

In alternative embodiments, the device 100 may include more or fewer SMI sensors 128. For example, the device may include a set of SMI sensors 128, each of which emits a respective beam of electromagnetic radiation 130 toward the front cover 106, but from a different x/y position below the front cover 106. In another example, the device 100 may include one or more SMI sensors 128 that emit respective beams of electromagnetic radiation 130 toward the rear cover 108, and/or the device 100 may include more or fewer SMI sensors 128 that emit respective beams of electromagnetic radiation 130 toward different sidewall portions of the device 100.

In alternative embodiments, the positions of any of the SMI sensors and corresponding optical elements may be swapped.

Figure 2:
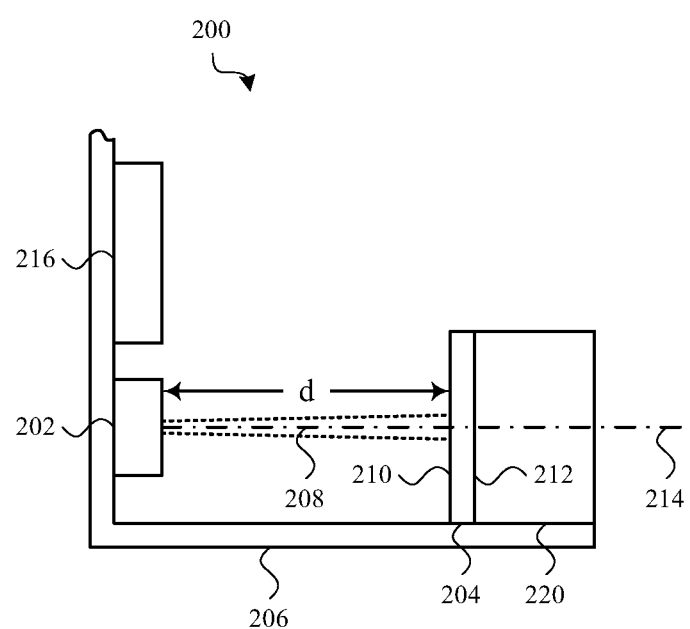
FIG. 2 shows an example portion of a device including an SMI sensor and an optical element.

FIG. 2 shows an example portion of a device 200 including an SMI sensor 202 and an optical element 204. The SMI sensor 202 may be positioned at a nominally fixed distance (d) from the optical element 204. In some embodiments, the nominally fixed distance may be maintained by a frame 206 to which both the SMI sensor 202 and optical element 204 are attached. The optical element 204 may in some cases be one of the optical elements described with reference to FIG. 1C (e.g., an optical film, substrate, or block of material), or the front or rear cover described with reference to FIGS. 1A-1C. The optical element 204 may be optionally attached to another element 220, such as a cover glass, a lens, or a frame component. The element 220 may be transparent, translucent, or opaque to electromagnetic radiation emitted by the SMI sensor 202.

The SMI sensor 202 may be configured to emit a modulated beam of electromagnetic radiation 208 toward a first surface 210 of the optical element 204, and to generate an SMI signal containing disturbances caused by reflections or backscatters of the beam 208 from first and second surfaces 210, 212 of the optical element 204. The first and second surfaces 210, 212 may be opposite surfaces of the optical element 204, and an electromagnetic radiation emission axis 214 of the SMI sensor 202 may intersect the first and second surfaces 210, 212—preferably at a right angle, to simplify computations.

The device 200 may further include a processor 216. The processor 216 may directly or indirectly receive samples of the SMI signal generated by the SMI sensor 202, or may itself sample the SMI signal. The processor 216 may be configured to relate disturbances in the SMI signal (i.e., the disturbances caused by the reflections or backscatters of the beam 208 from the first and second surfaces 210, 212 of the optical element 204, which disturbances appear in the samples of the SMI signal) to a known optical thickness of the optical element 204. In some cases, relating the disturbances to the known optical thickness may include relating the disturbances to a known physical thickness of the optical element 204 using a known refractive index of the optical element 204 and/or other information. The processor 216 may also be configured to determine a distance between two objects (e.g., a distance (d) between the SMI sensor 202 and the optical element 204) using the SMI signal and the relationship of the disturbances to the known optical thickness of the optical element 204. The objects may be the SMI sensor 202 and the optical element 204; or the SMI sensor 202 and any other object in the path of the beam of electromagnetic radiation 208 (e.g., another object attached to the frame 206, an object held by a user (e.g., a stylus), a body part a user (e.g., a finger or facial feature), dust, or any object internal or external to the device 200 which is in the path of the beam of electromagnetic radiation 208; or a first object having a fixed relationship to the SMI sensor 202 and a second object in the path of the beam of electromagnetic radiation 208; or any two objects in the path of the beam of electromagnetic radiation 208.

In some cases, the processor 216 may be configured to identify the disturbances in the SMI signal and/or characterize (e.g., measure) one or more parameters of the disturbances. For example, the processor 216 may perform a fast Fourier transform (FFT) on the samples of the SMI signal, and identify 1) a first frequency component, and magnitude of the first frequency component, corresponding to a reflection or backscatter of the beam 208 from the first surface 210, and 2) a second frequency component, and magnitude of the second frequency component, corresponding to a reflection or backscatter of the beam 208 from the second surface 212.

In some cases, the processor 216 may be configured to modulate a wavelength of the beam of electromagnetic radiation 208 (to produce a modulated beam). For example, when generating the SMI signal containing the disturbances caused by reflections or backscatters of the beam 208 from the first and second surfaces 210, 212, which disturbances are related to the known optical thickness of the optical element 204, the processor 216 may triangularly modulate a wavelength of the beam 208 (to produce a triangularly modulated beam). The triangular modulation may have a triangular modulation frequency of $f_{triangle}$. When determining a displacement, velocity, or other movement parameter of the optical element 204, the processor 216 may triangularly, sinusoidally (to produce a sinusoidally modulated beam), or otherwise modulate a wavelength of the beam 208. In some cases, the processor 216 may modulate a wavelength of the beam 208 by modulating the current or junction voltage of the SMI sensor 202.

Figure 3A:
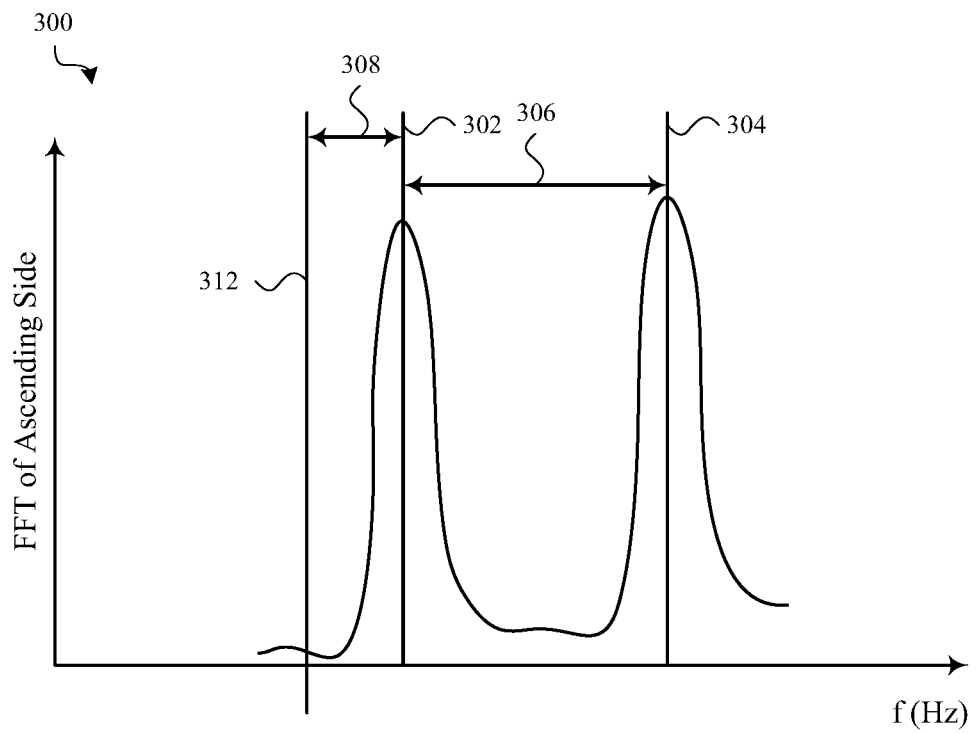
FIG. 3A shows a fast Fourier transform (FFT) performed on samples corresponding to ascending sides of a triangularly modulated beam of electromagnetic radiation.
Figure 3B:
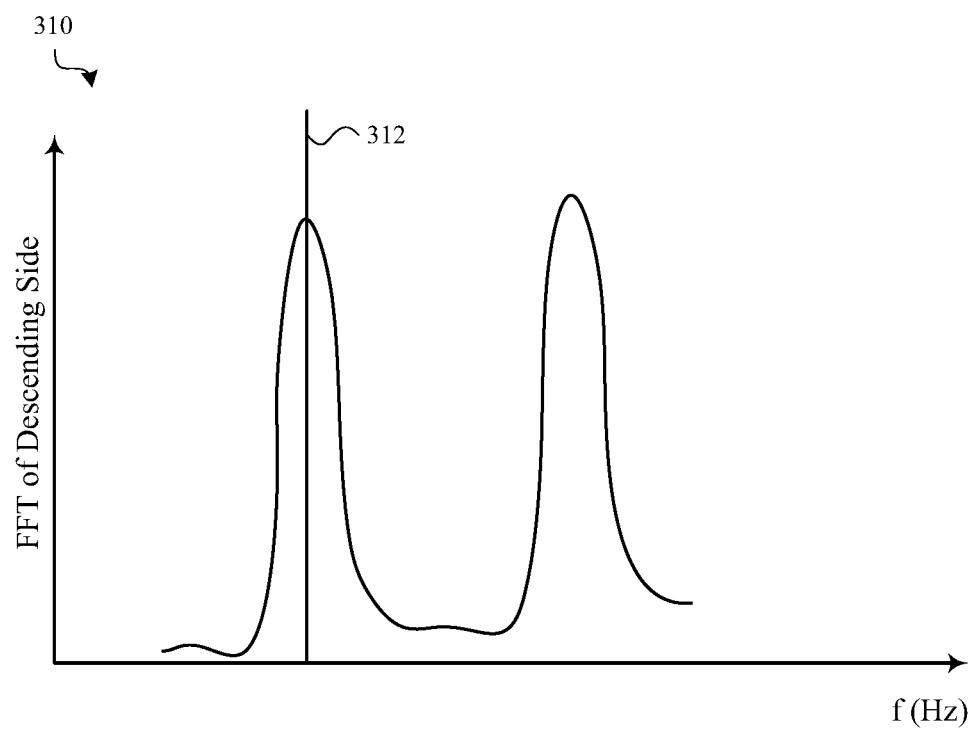
FIG. 3B shows an FFT performed on samples corresponding to descending sides of a triangularly modulated beam of electromagnetic radiation.

As previously mentioned, the processor 216 may in some cases perform an FFT on the samples of the SMI signal generated by the SMI sensor 202. An FFT performed on an example set of samples of an SMI signal is shown in FIGS. 3A and 3B. FIG. 3A shows an FFT 300 performed on the samples corresponding to ascending sides of a triangularly modulated beam 208, and FIG. 3B shows an FFT 310 performed on the samples corresponding to descending sides of the triangularly modulated beam 208. For increased frequency bin resolution, multiple ascending (or descending) sides can be concatenated after appropriate windowing (Gaussian, Hanning, Blackman, etc.) and inputted to an FFT processor. To cancel out white-noise contributions, the FFT peak values (e.g., values at frequencies 302, 304, and 312) of multiple ascending (or descending) sides can be averaged out. Improved resolution of the FFT peaks, beyond the FFT bin resolution, can be achieved using interpolation (e.g., linear, parabolic, Gaussian, etc.), using neighboring bin values.

In FIG. 3A, the frequency difference 306 between FFT peaks 302, 304 is equal to:

$$f_{ref} = 4 f_{triangle} \frac{\Delta \lambda}{\lambda^2} d_{ref}$$

where $d_{ref}$ is the known optical thickness of the optical element (or distance reference). The frequency shift 308 (Doppler shift) between FFT peaks 302, 312 of ascending and descending sides is equal to:

$$2 f_{doppler} = 4 v_{target} / \lambda$$

where $v_{target}$ corresponds to unintended (or intended) movement of the optical reference.

Figure 4:
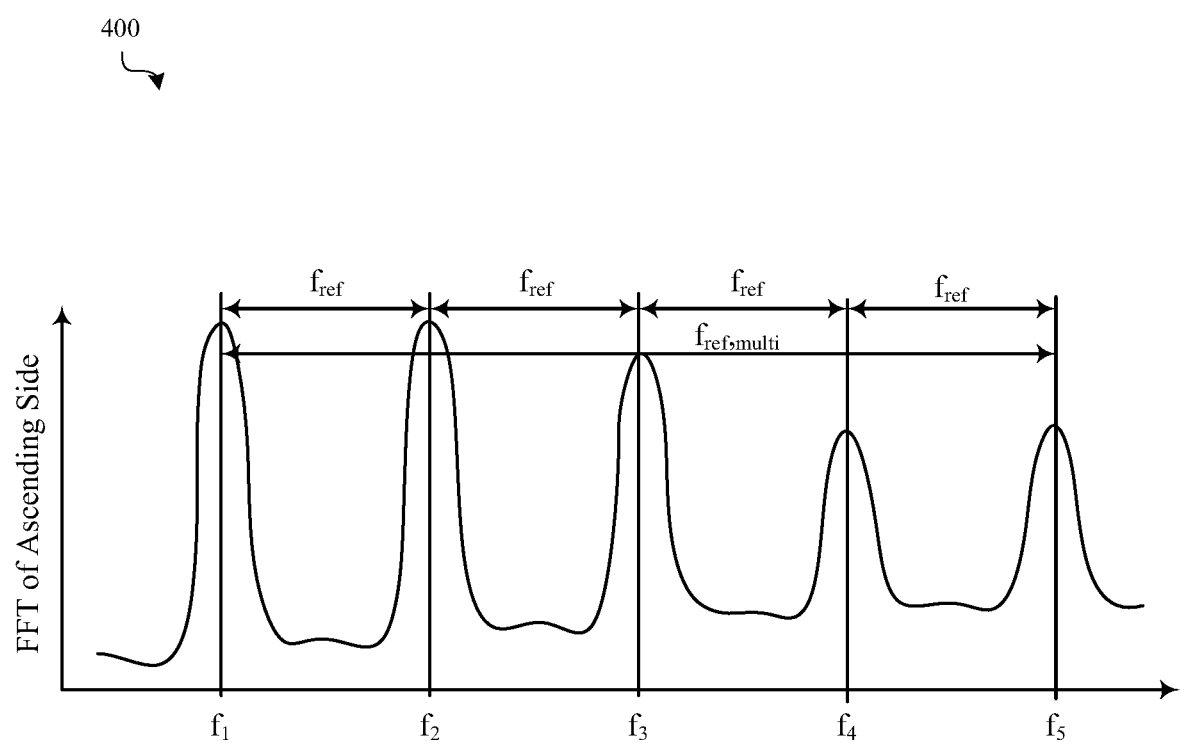
FIG. 4 shows an FFT performed on an alternative set of samples corresponding to ascending sides of a triangularly modulated beam of electromagnetic radiation.
Figure 5:
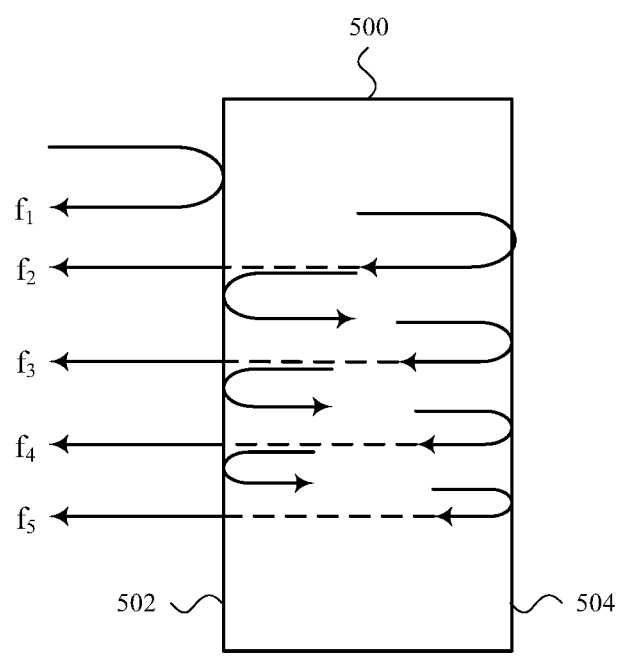
FIG. 5 show reflections of a beam of electromagnetic radiation within an example optical element.

FIG. 4 shows an FFT 400 performed on an alternative set of samples corresponding to ascending sides of a triangularly modulated beam 208. The FFT 400 differs from the FFT 300 in that it includes additional frequency components at frequencies $f_3$, $f_4$, and $f_5$. When these frequency components are separated from each other by the frequency $f_{ref}$, the frequency components may correspond to electromagnetic radiation received by the SMI sensor after one or more additional reflections between the first and second surfaces of the optical element 204. The additional reflections corresponding to the frequencies $f_3$, $f_4$, and $f_5$, as well as the reflections corresponding to $f_1$ (i.e., a first reflection off the first surface of the optical element) and $f_2$ (i.e., a first reflection off the second surface of the optical element), are shown in FIG. 5. FIG. 5 shows an optical element 500 having first and second opposing surfaces 502, 504 off which a beam of electromagnetic radiation reflects. In some cases, a portion of the beam may also pass through both the first and second opposing surfaces 502, 504. In some cases, a coating or surface treatment may be applied to the first and/or second surface of the optical element 500 to control how much electromagnetic radiation reflects from or passes through the surface. When coatings or surface treatments are applied to the first and second surfaces 502, 504, the same or different coatings or surface treatments may be applied to each surface 502, 504. The material from which the optical element 500 is made may also be chosen to adjust reflection, absorption, and pass-through of electromagnetic radiation.

The additional frequency components (or peaks) shown in FIG. 4, as caused by the additional reflections shown in FIG. 5, can be used to determine an average (and in some cases more accurate) frequency spacing, $f_{ref}$, between the frequency components.

Figure 6:
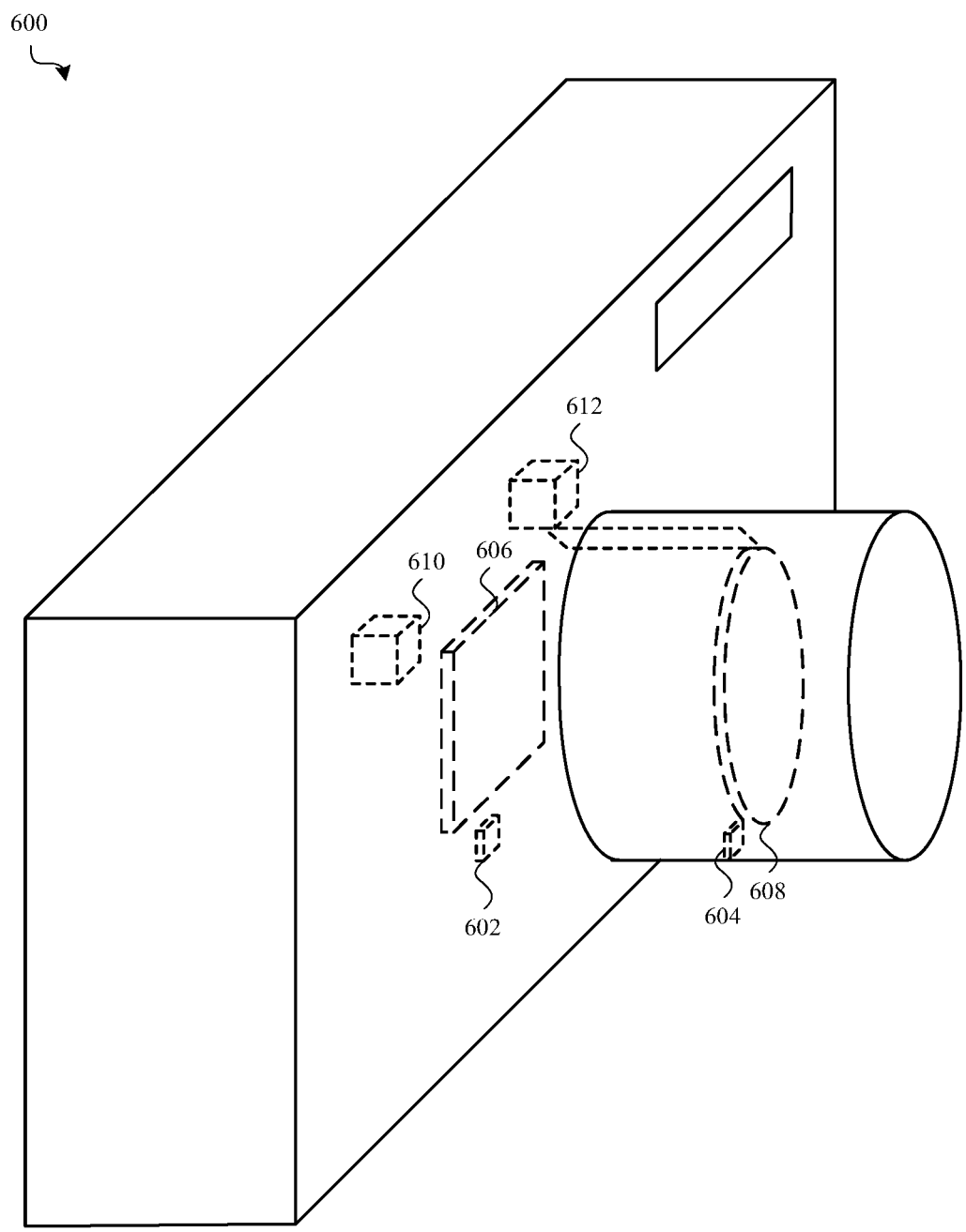
FIG. 6 shows another example of a device that includes an SMI-based absolute distance measurement system.

FIG. 6 shows another example of a device 600 that includes an SMI-based absolute distance measurement system. The SMI-based absolute distance measurement system may include an SMI sensor 602 that emits electromagnetic radiation toward an optical element 604. By way of example, the device 600 may be a camera, and the two components are shown to be an image sensor 606 and a lens 608 (or set of lenses). In some cases, the optical element 604 may be an optical film, substrate, or block of material that is separate from the lens 608. In other cases, the optical element 604 and lens 608 may be the same component, or the optical element 604 may be one of the lenses in a set of lenses.

The SMI sensor 602 may have a fixed relationship with respect to the image sensor 606, and the optical element 604 may have a fixed relationship with respect to the lens 608. Alternatively, the positions of the SMI sensor 602 and optical element 604 may be swapped.

The distance between the image sensor 606 and the lens 608 may be adjustable. In some embodiments, the distance may be adjusted automatically, such as, in response to a processor 610 that performs an auto-focus function and sends instructions to a motor 612 that moves the lens 608 with respect to the image sensor 606. In these embodiments, the motor 612 may have a fixed relationship with respect to the image sensor 606. Alternatively, the motor 612 may have a fixed relationship with respect to the lens 608, and the processor 610 may send instructions to the motor 612 to move the image sensor 606 with respect to the lens 608. Alternatively, the distance may be adjusted manually, such as by a user.

In the case of a processor 610 performing an auto-focus function, the processor 610 may use the SMI sensor 602 to measure a distance (e.g., a first distance) between the SMI sensor 602 and the optical element 604. Alternatively, given the fixed relationships between the SMI sensor 602 and image sensor 606, and between the optical element 604 and lens 608, the processor 610 may also or alternatively determine a distance between the image sensor 606 and the lens 608. The distance(s) is/are determined by characterizing disturbances in the SMI signal, which disturbances are caused by reflections or backscatters of a beam of electromagnetic radiation, emitted by the SMI sensor 602, from first and second surfaces of the optical element 604; relating the disturbances to a known optical thickness of the optical element 604 (i.e., an optical thickness between the first and second surfaces of the optical element 604); and determining the distance between the SMI sensor 602 and optical element 604 using the SMI signal and the relationship of the disturbances to the known optical thickness of the optical element 604, as described in more detail with reference to FIGS. 7 and 3A-5 (and other figures). In some cases, relating the disturbances to the known optical thickness may include relating the disturbances to a known physical thickness of the optical element 604 using a known refractive index of the optical element 604 and/or other information.

In some cases, the processor 610 may triangularly modulate a wavelength of the beam of electromagnetic radiation (to produce a triangularly modulated beam) when sampling an SMI signal to determine the distance between the SMI sensor 602 and the optical element 604. Thereafter, an auto-focus operation may be performed and the lens 608 may be adjusted (e.g., moved) with respect to the image sensor 606, thereby changing the distance between the lens 608 and the image sensor 606, and also changing the distance between the SMI sensor 602 and the optical element 604. In some embodiments, the processor 610 may sinusoidally modulate a wavelength of the beam of electromagnetic radiation (to produce a sinusoidally modulated beam) while moving the lens 608 with respect to the image sensor 606, and may monitor the phase and/or count phase changes of the sinusoidally modulated beam (e.g., in radians) to determine how far the lens 608 has been moved (i.e., to determine a displacement of the lens 608 due to the adjustment). After the lens 608 has been moved to a new position, the distance (e.g., a second distance) between the SMI sensor 602 and optical element 604 may be measured (e.g., confirmed) while the processor 610 once again triangularly modulates the beam emitted by the SMI sensor 602.

Other types of devices may also have first and second components that are movable with respect to one another, and may have an SMI sensor mounted in a fixed relationship with respect to one of the components, and an optical element mounted in a fixed relationship with respect to the other one of the components. For example, the two components may be a glasses/goggles frame and a lens, or two different lenses in a camera or glasses/goggles frame (e.g., a distance between the lenses of a glasses/goggles frame may be adjusted to match an interpupillary distance (IPD) of a user of the glasses/goggles), or two components of a machine (e.g., two components of a semiconductor pick-and-place machine, a surgical machine, and so on). In the case of a pair of glasses or goggles, an IPD sensor may sense an IPD of a user and trigger operation of a motor that adjusts the IPD of the pair of glasses or goggles to match the sensed IPD of the user.

Figure 7:
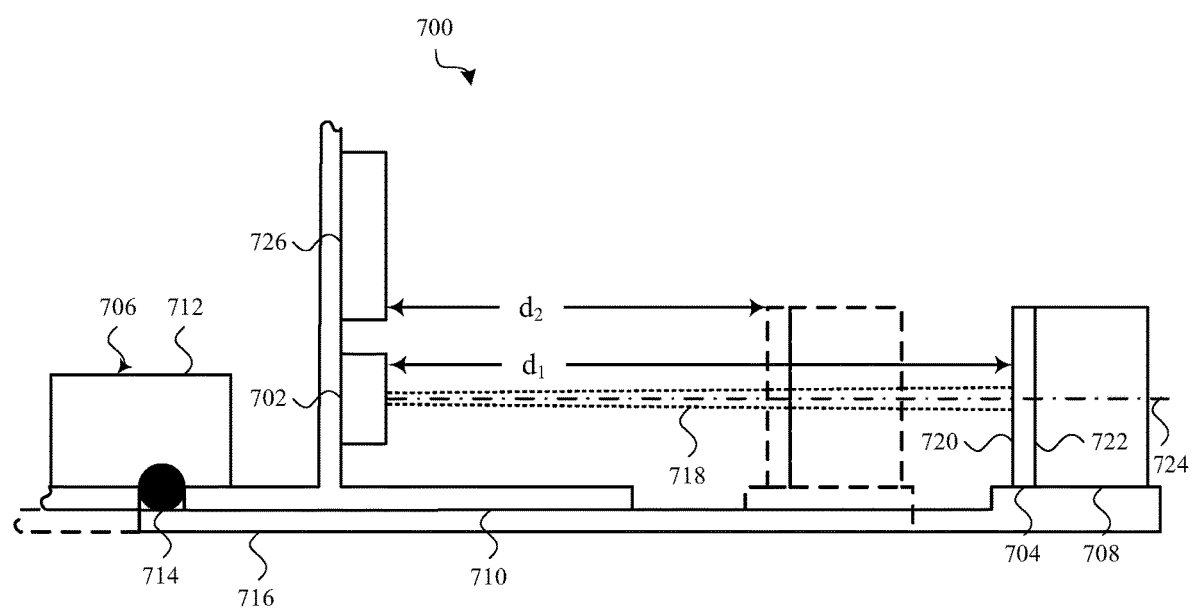
FIG. 7 shows an example portion of a device including an SMI sensor and an optical element.

FIG. 7 shows an example portion of a device 700 including an SMI sensor 702 and an optical element 704. At some arbitrary point in time, the SMI sensor 702 may be positioned at a first distance ($d_1$) from the optical element 704. At a second point in time, the SMI sensor 702 may be positioned at a second distance ($d_2$) from the optical element 704. Thus, the distance between the SMI sensor 702 and the optical element 704 (or the distance between components to which the SMI sensor 702 and optical element 704 are respectively attached) is a reconfigurable distance. In between the first and second points in time, or at other times, the optical element 704 may be moved with respect to the SMI sensor 702. In some cases, the optical element 704 may be moved with respect to the SMI sensor 702 by a motor 706.

The optical element 704 may in some cases be one of the optical elements described with reference to FIG. 6 (e.g., an optical film, substrate, block of material, or lens).

The optical element 704 may have a fixed relationship with respect to one or more components of the device 700, which component(s) may in some cases include a first component 708 (e.g., a first frame component, and/or a first lens, or a first lens holder). The SMI sensor 702 may have a fixed relationship with respect to one or more other components of the device 700, which component(s) may in some cases include a second component 710 (e.g., a second frame component, and/or a second lens, or a second lens holder). By way of example, the motor 706 is shown to have a motor housing 712 attached to the second component 710. A shaft attached to a pinion gear 714 may extend from the motor housing 712, and the pinion gear 714 may engage a linear rack 716 attached to (or formed in) the first component 708. Rotation of the pinion gear 714 by the motor 706 therefore adjusts the distance between the first component 708 and the second component 710 (and therefore, the distance between the SMI sensor 702 and the optical element 704).

The SMI sensor 702 may be configured to emit a modulated beam of electromagnetic radiation 718 toward a first surface 720 of the optical element 704, and to generate an SMI signal containing disturbances caused by reflections or backscatters of the beam 718 from first and second surfaces 720, 722 of the optical element 704. The first and second surfaces 720, 722 may be opposite surfaces of the optical element 704, and an electromagnetic radiation emission axis 724 of the SMI sensor 702 may intersect the first and second surfaces 720, 722—and preferably at a right angle, to simplify computations.

The device 700 may further include a processor 726. The processor 726 may directly or indirectly receive samples of the SMI signal generated by the SMI sensor 702, or may generate the samples of the SMI signal. The processor 726 may be configured to relate disturbances in the SMI signal (i.e., the disturbances caused by the reflections or backscatters of the beam 718 from the first and second surfaces 720, 722 of the optical element 704, which disturbances appear in the samples of the SMI signal) to a known optical thickness of the optical element 704. In some cases, relating the disturbances to the known optical thickness may include relating the disturbances to a known physical thickness of the optical element 704 using a known refractive index of the optical element 704 and/or other information. The processor 726 may also be configured to determine a distance (e.g., $d_1$ or $d_2$) between the first and second components 708, 710 (or between the SMI sensor 702 and the optical element 704, and so on) using the SMI signal and the relationship of the disturbances to the known optical thickness of the optical element 704. For purposes of this description, determining the distance between the first and second components 708, 710 is considered equivalent to determining the distance between the SMI sensor 702 and optical element 704, or determining the distance between any combination thereof separated by a configurable distance.

In some cases, the processor 726 may be configured to identify the disturbances in the SMI signal and/or characterize (e.g., measure) one or more parameters of the disturbances. For example, the processor 726 may perform an FFT on the samples of the SMI signal, and identify 1) a first frequency component, and magnitude of the first frequency component, corresponding to a reflection or backscatter of the beam emitted by the SMI sensor 702 from the first surface 720, and 2) a second frequency component, and magnitude of the second frequency component, corresponding to a reflection or backscatter of the beam from the second surface 722.

In some cases, the processor 726 may be configured to modulate a wavelength of the beam of electromagnetic radiation (to produce a modulated beam). For example, when the first and second components 708, 710 are stationary with respect to each other (or moving slow enough with respect to each other, within the measurement time, that their movement can be neglected), the processor 726 may triangularly modulate the electromagnetic radiation of the SMI sensor 702 while obtaining a set of samples of the SMI signal generated by the SMI sensor 702 (i.e., while sampling the SMI signal). The set of samples may be used by the processor 726 to identify the disturbances in the SMI signal. In some embodiments, the processor 726 may triangularly modulate a wavelength of the beam (to produce a triangularly modulated beam).

In some embodiments, the processor 726 may determine the first distance ($d_1$) between the SMI sensor 702 and the optical element 704 (or a corresponding first distance between the first and second components 708, 710); adjust the distance between the SMI sensor 702 and the optical element 704 to the second distance ($d_2$) (or equivalently, adjust the distance between the first and second components 708, 710); and then determine the second distance (or a corresponding second distance between the first and second components 708, 710). After obtaining a first set of samples of the SMI signal for the purpose of determining the first distance ($d_1$), and before adjusting the distance between the SMI sensor 702 and the optical element 704 to the second distance ($d_2$), the processor 726 may switch the modulation of the wavelength of the SMI sensor's beam of electromagnetic radiation to a sinusoidal modulation. The processor 726 may then adjust the distance between the first and second components 708, 710 while the electromagnetic radiation is sinusoidally modulated, and may obtain a second set of samples of the SMI signal while the distance is being adjusted (e.g., the processor 726 may obtain the samples over the entire duration of the adjustment). The processor 726 may use the second set of samples to monitor the phase and/or count phase changes of the sinusoidally modulated beam (e.g., in radians), to determine a change in displacement between the first and second components 708, 710 due to the adjustment. After the distance between the SMI sensor 702 and the optical element 704 has been adjusted to the second distance ($d_2$), the processor 726 may switch the modulation of the wavelength of the SMI sensor's beam of electromagnetic radiation to the triangular modulation, and obtain a third set of samples of the SMI signal while the electromagnetic radiation is triangularly modulated. The third set of samples may be used to determine the second distance ($d_2$), in a manner similar to how the first set of samples may be used to determine the first distance ($d_1$).

In some cases, the first distance ($d_1$), second distance ($d_2$), and second set of samples may be used to determine a wavelength ($\lambda$) of the electromagnetic radiation emitted by the SMI sensor 702. For example, a difference between the first and second distances may be determined (e.g., $d_2-d_1$), and a phase difference (or number of phases) of the sinusoidal modulation measured by the SMI sensor 702 during the adjustment of the distance between the SMI sensor 702 and optical element 704 may be correlated to the distance $d_2-d_1$ to determine the wavelength.

Figure 8:
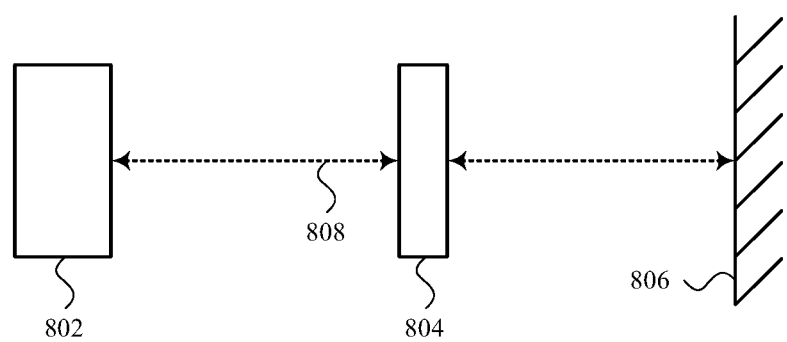
FIG. 8 shows an example arrangement of an SMI sensor and an optical element with respect to an object.

FIG. 8 shows an example arrangement of an SMI sensor 802 and optical element 804 with respect to an object 806. The SMI sensor 802 and optical element 804 may be mounted in or on a device, and the object 806 may be external to the device. Alternatively, the object 806 may be mounted in or on the device, but on an opposite side of the optical element 804 from the SMI sensor 802 (i.e., with the optical element 804 positioned between the SMI sensor 802 and object 806). The SMI sensor 802 and optical element 804 may be mounted at fixed or adjustable positions with respect to each other. In some cases, the SMI sensor 802 and optical element 804 may be an SMI sensor and optical element described with reference to FIG. 1C, 2, 6, or 7.

A portion of a beam 808 of electromagnetic radiation emitted by the SMI sensor 802 may pass through the optical element 804 and impinge on, and reflect from, the object 806. In addition to determining the distance between the SMI sensor 802 and the optical element 804, a processor of the device may use an SMI signal generated by the SMI sensor 802, in combination with a known optical thickness of the optical element 804 (and in some cases other information), to determine a distance to the object 806.

In alternative embodiments, the object 806 may be positioned between the SMI sensor 802 and optical element 804. In these cases, the object 806 needs to be at least partially transparent, to allow light to reach the optical element 804.

Figure 9:
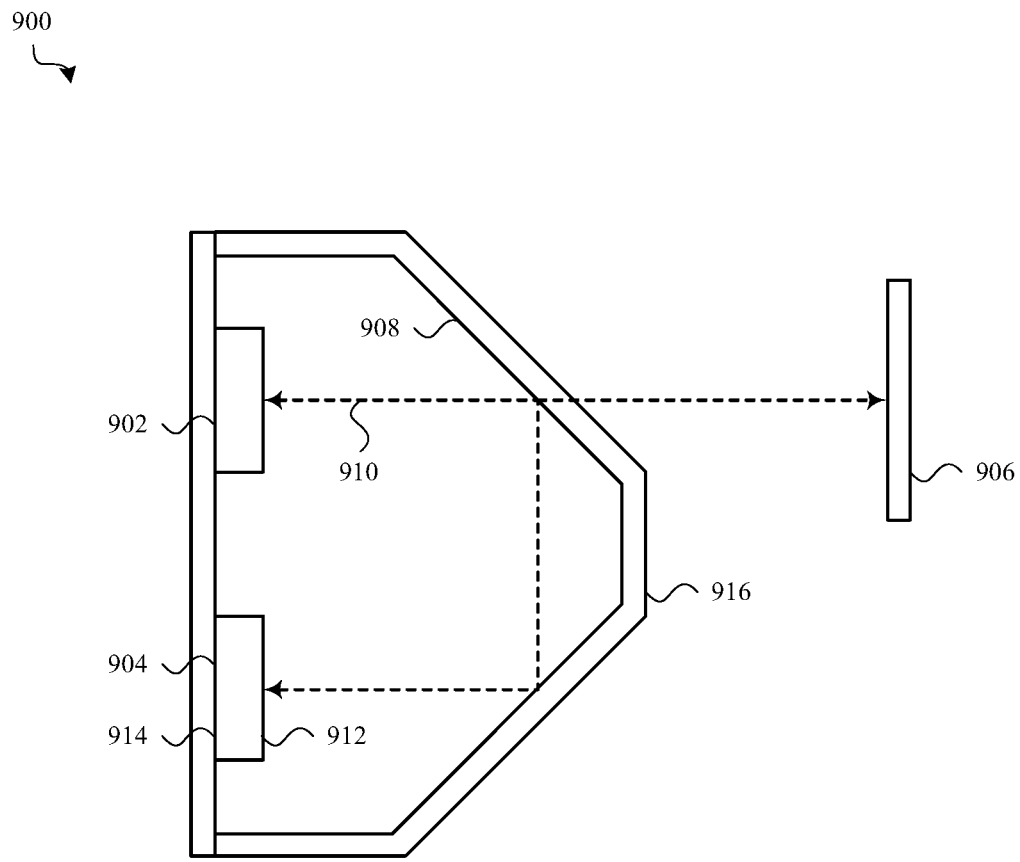
FIG. 9 shows an example alternative arrangement of an SMI sensor and an optical element with respect to an object.

FIG. 9 shows an example alternative arrangement of an SMI sensor 902 and optical element 904 with respect to an object 906. In the arrangement shown in FIG. 9, the SMI sensor 902 and optical element 904 are mounted within a module 900 having a partially reflective (e.g., partially mirrored) internal surface 908 that functions as a beam splitter. For example, a first portion of a beam 910 of electromagnetic radiation emitted by the SMI sensor 902 may be reflected within the module 900, and onto a first surface 912 of the optical element 904. A first sub-portion of the first portion of the beam 910 may reflect from the first surface 912; reflect within the module 900; and be received back into a resonant cavity of the SMI sensor 902. A second sub-portion of the first portion of the beam 910 may reflect from a second surface 914 of the optical element 904, opposite the first surface 912; reflect within the module 900; and be received back into the resonant cavity of the SMI sensor 902. A second portion of the beam 910 may pass through a housing 916 of the module 900; reflect from the object 906, exterior to the module 900; pass back through the housing 916 of the module 900; and be received back into the resonant cavity of the SMI sensor 902.

In addition to determining the distance between the SMI sensor 902 and the optical element 904, a processor of a device including the module 900 may use an SMI signal generated by the SMI sensor 902, in combination with a known optical thickness of the optical element 904 (and in some cases other information), to determine a distance to the object 906.

Figure 10:
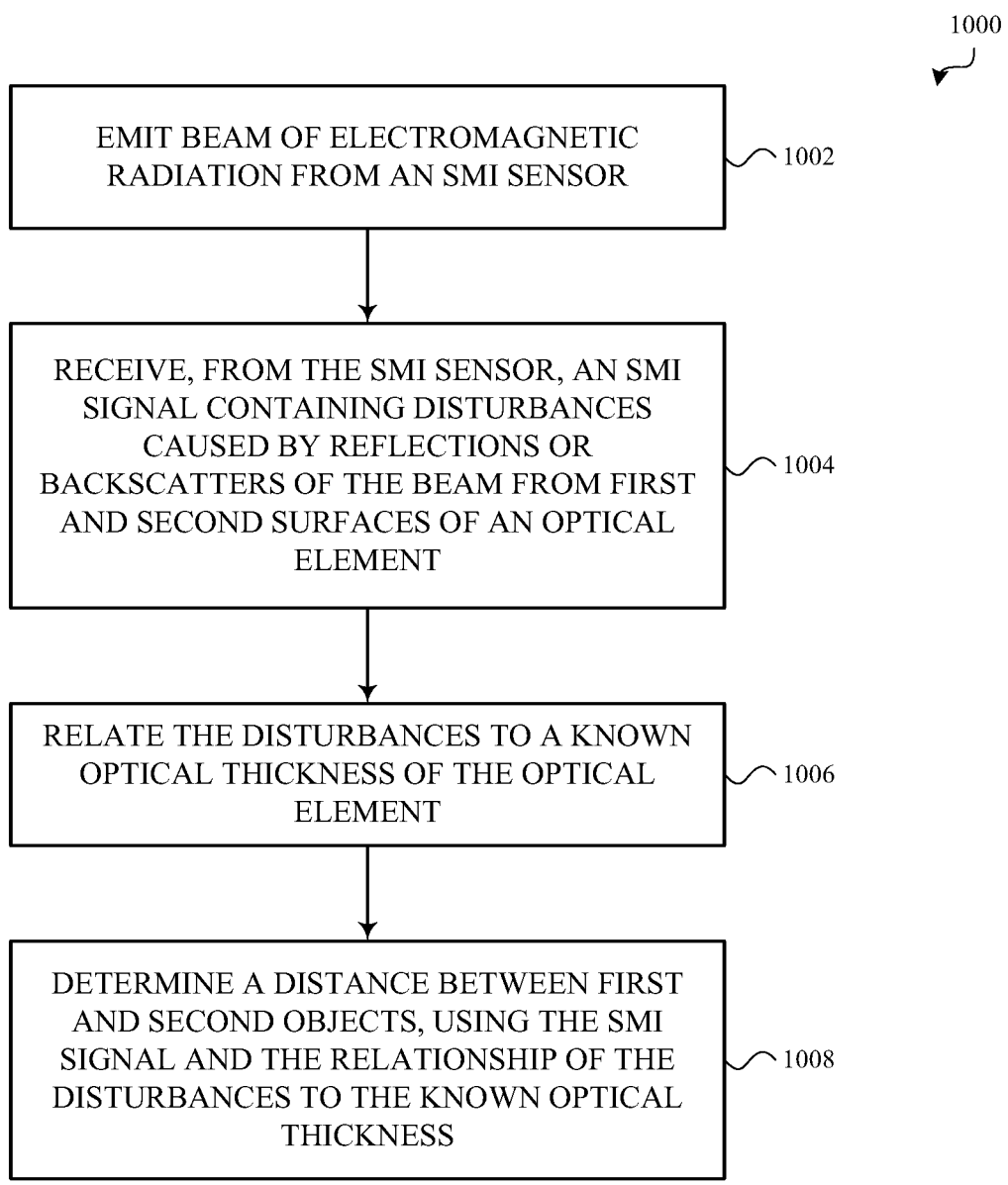
FIG. 10 shows an example method of determining a distance between a first object and a second object.

FIG. 10 shows an example method 1000 of determining a distance between a first object and a second object. The method 1000 may be employed by the processor, or other components, described with reference to FIGS. 1A-1C, 2, 6, and 7.

At block 1002, the method 1000 may include emitting a beam of electromagnetic radiation from an SMI sensor having a fixed relationship with respect to the first object.

At block 1004, the method 1000 may include receiving, from the SMI sensor, an SMI signal containing disturbances caused by reflections or backscatters of the beam from first and second surfaces of an optical element having a fixed relationship with respect to the second object.

At block 1006, the method 1000 may include relating the disturbances to a known optical thickness of the optical element.

At block 1008, the method 1000 may include determining a distance between the first object and the second object, using the SMI signal and the relationship of the disturbances to the known optical thickness of the optical element.

Figure 11:
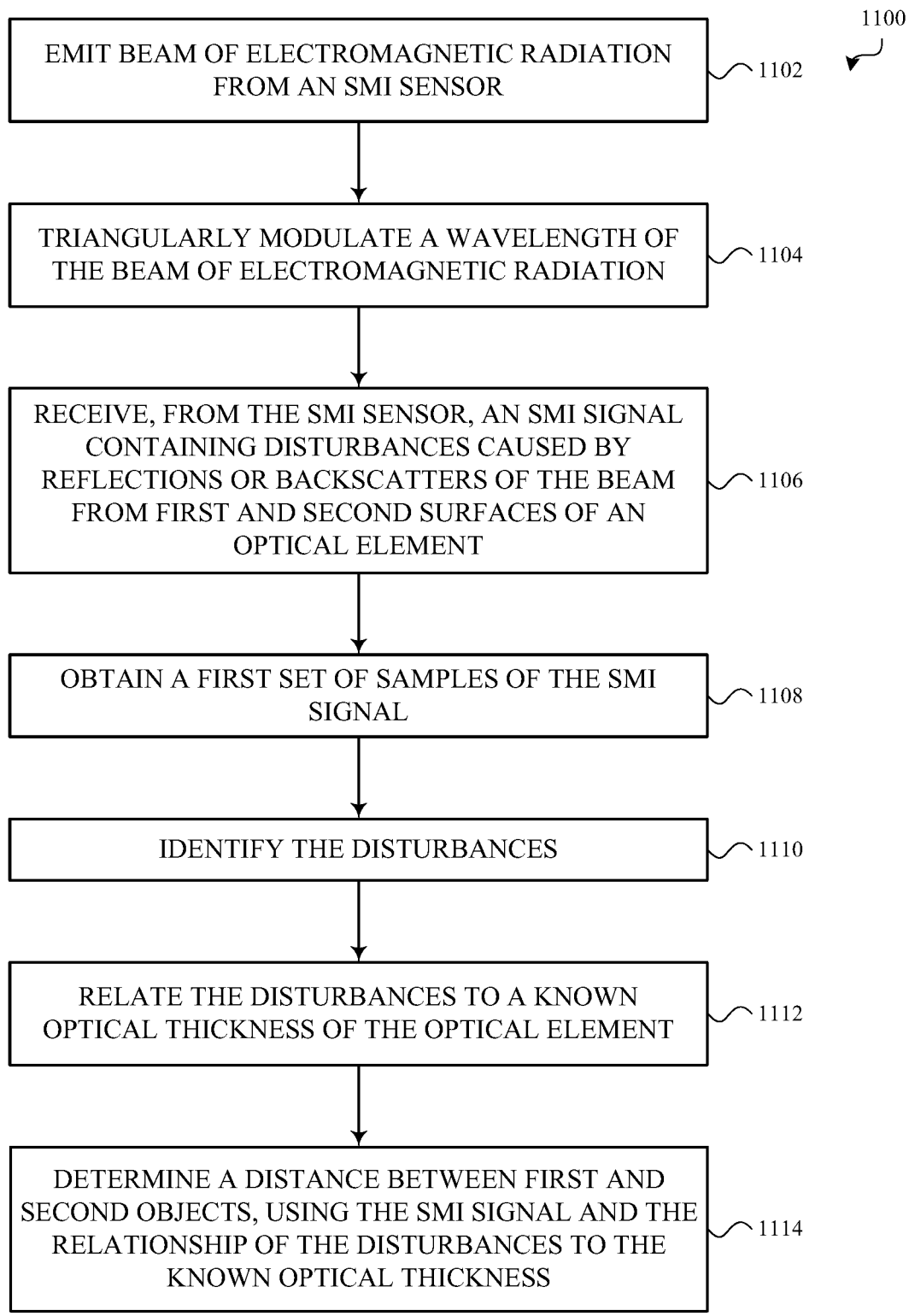
FIG. 11 shows another example method of determining a distance between a first object and a second object.

FIG. 11 shows another example method 1100 of determining a distance between a first object and a second object. The method 1100 may also be employed by the processor, or other components, described with reference to FIGS. 1A-1C, 2, 6, and 7.

At block 1102, the method 1100 may include emitting a beam of electromagnetic radiation from an SMI sensor having a fixed relationship with respect to the first object.

At block 1104, the method 1100 may include triangularly modulating the wavelength of the beam of electromagnetic radiation. Although perfect triangular modulation is ideal, most of the time it is impossible to achieve a perfect triangular modulation. For example, due to nonlinearities in the laser, its supporting electronics, and/or other factors, deviations from an ideal triangular modulation can occur. However, if the deviation is small and controlled, and signal-to-noise ratio is sufficiently high, information can still be reliably extracted in the presence of such deviations. For purposes of this description, triangular modulation including such irregularities is still considered triangular modulation.

At block 1106, the method 1100 may include receiving, from the SMI sensor, an SMI signal containing disturbances caused by reflections or backscatters of the beam from first and second surfaces of an optical element having a fixed relationship with respect to the second object.

At block 1108, while the SMI signal is being received, and while the beam of electromagnetic radiation is triangularly modulated, the method 1100 may include obtaining a first set of samples of the SMI signal.

At block 1110, the method 1100 may include identifying the disturbances within the first set of samples. In some cases, the disturbances may be identified, for example, by identifying waveform peaks that exceed a threshold value in the time domain or the frequency domain.

At block 1112, the method 1100 may include relating the disturbances to a known optical thickness of the optical element.

At block 1114, the method 1100 may include determining a distance between the first object and the second object, using the SMI signal and the relationship of the disturbances to the known optical thickness of the optical element.

The operations performed at blocks 1102-1108, and in some cases the operations performed at all blocks of the method 1100, may be performed while the first and second objects are stationary with respect to one another.

Figure 12:
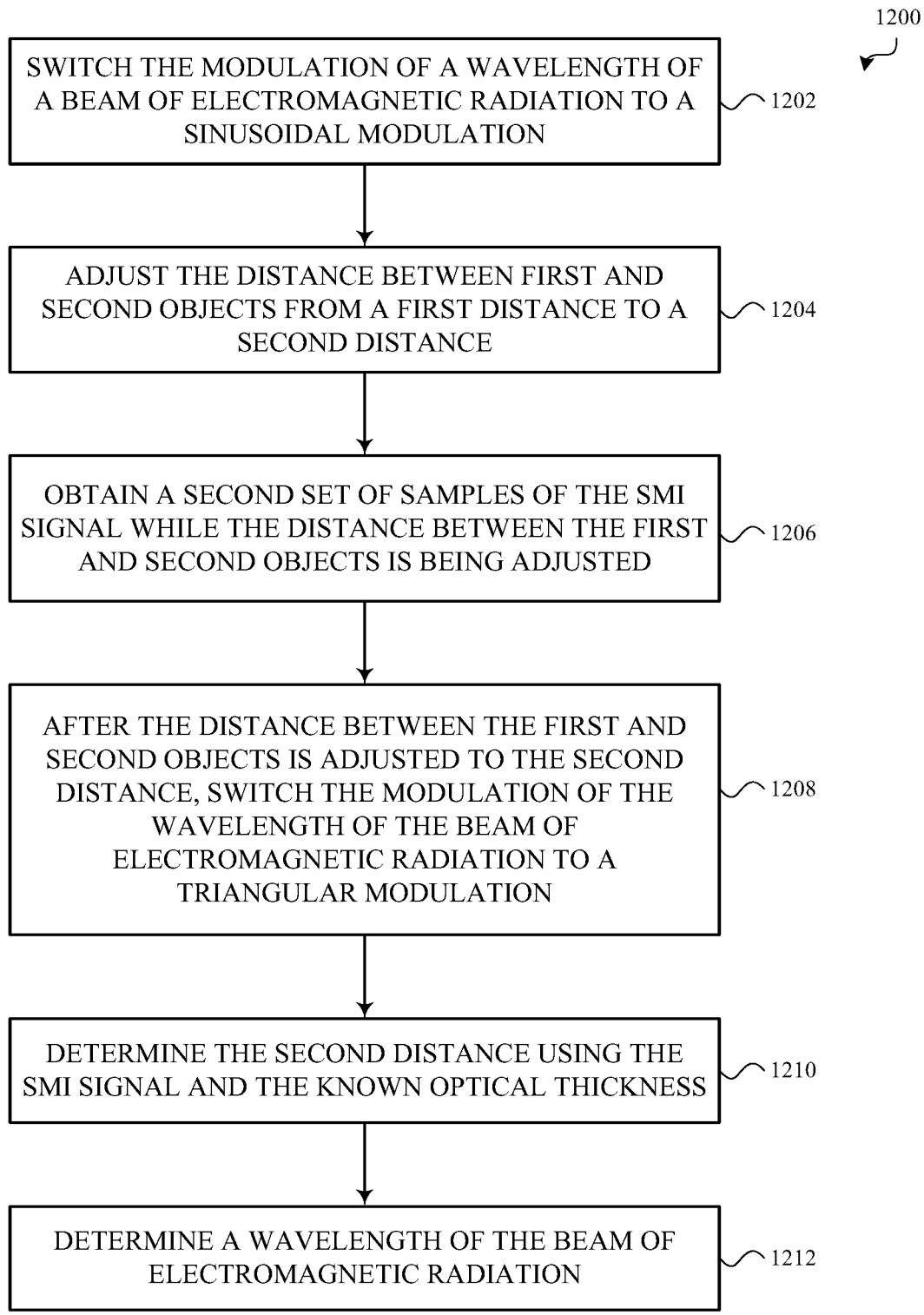
FIG. 12 shows a method that, in some cases, may be performed after the operations of the method described with reference to FIG. 11.

FIG. 12 shows a method 1200 that, in some cases, may be performed after the operations of the method 1100. The method 1200 may be used to not only determine the distance between the first and second objects, but a wavelength of the electromagnetic radiation emitted by the SMI sensor. Determining (or measuring) the wavelength can enable a high resolution tracking of the target in displacement mode (such as the I/Q mode or method described herein). The method 1200 presumes that the distance determined at block 1114 of method 1100 is a first distance between the first and second objects.

At block 1202, and after obtaining the first set of samples (at block 1108 of method 1100), the method 1200 may include switching the modulation of the wavelength of the beam of electromagnetic radiation to a sinusoidal modulation.

At block 1204, the method 1200 may include adjusting the distance between the first object and the second object, from the first distance to a second distance, while the beam of electromagnetic radiation is sinusoidally modulated.

At block 1206, the method 1200 may include obtaining a second set of samples of the SMI signal while the distance between the first object and the second object is being adjusted from the first distance to the second distance.

At block 1208, and after the distance between the first and second objects is adjusted to the second distance, the method 1200 may include switching the modulation of the wavelength of the beam of electromagnetic radiation to the triangular mediation.

At block 1210, the method 1200 may include determining the second distance using the SMI signal and the known optical thickness. The second distance may be determined similarly to the first distance (e.g., using the method described with reference to FIG. 11).

At block 1212, the method 1200 may include determining a wavelength ($\lambda$) of the beam of electromagnetic radiation using the first distance, the second distance, and the second set of samples.

Figure 13A:
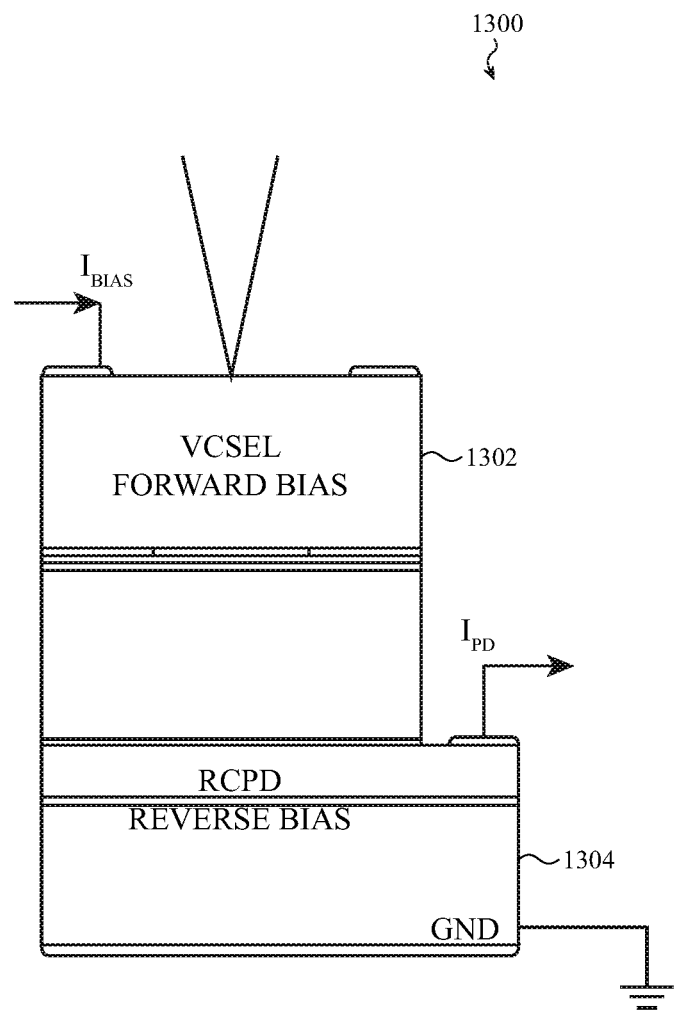
FIGS. 13A-13D show example SMI sensors that may be used in one or more of the systems, devices, or methods described with reference to FIGS. 1A-12.

FIG. 13A shows a first example SMI sensor 1300 that may be used in one or more of the systems, devices, or methods described with reference to FIGS. 1A-12. In this example, the SMI sensor 1300 may include a VCSEL 1302 with an integrated resonant cavity (or intra-cavity) photodetector (RCPD) 1304.

Figure 13B:
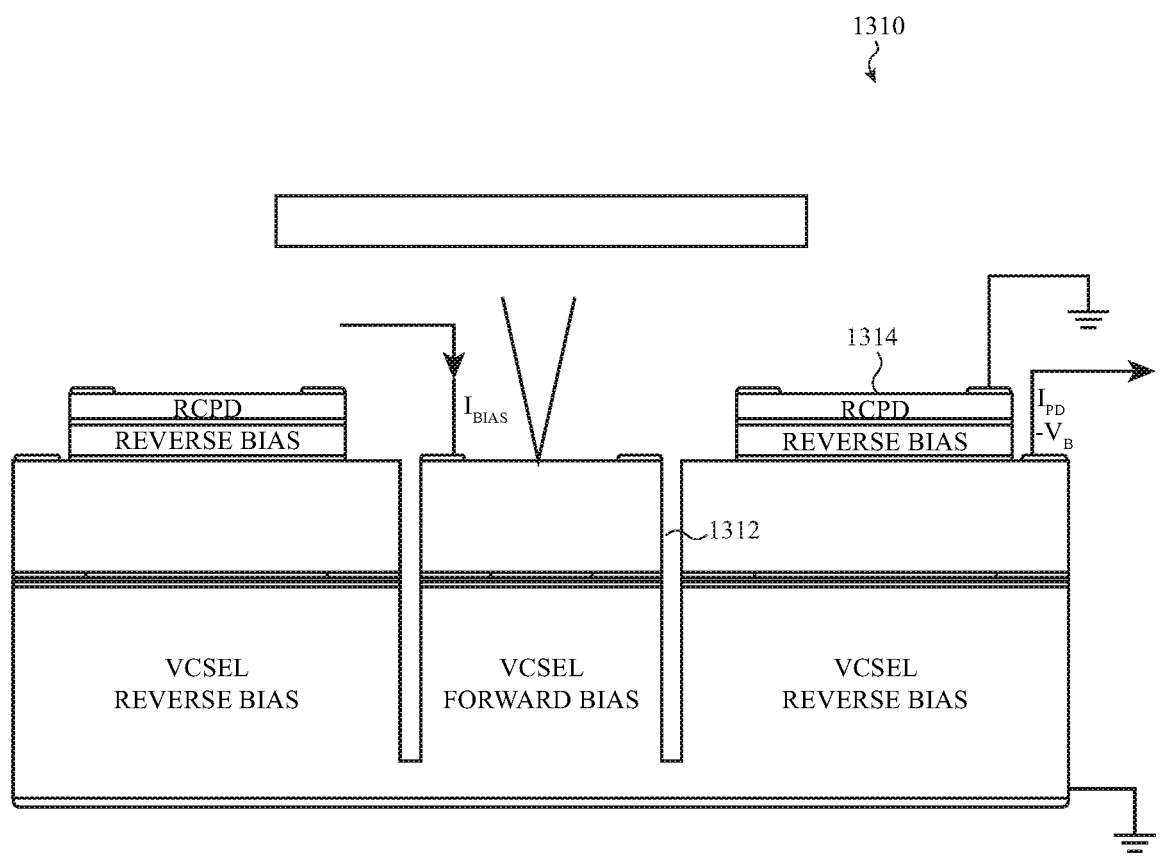

FIG. 13B shows a second example SMI sensor 1310 that may be used in one or more of the systems, devices, or methods described with reference to FIGS. 1A-12. In this example, the SMI sensor 1310 may include a VCSEL 1312 with an extrinsic on-chip RCPD 1314. As an example, the RCPD 1314 may form a disc around the VCSEL 1312.

Figure 13C:
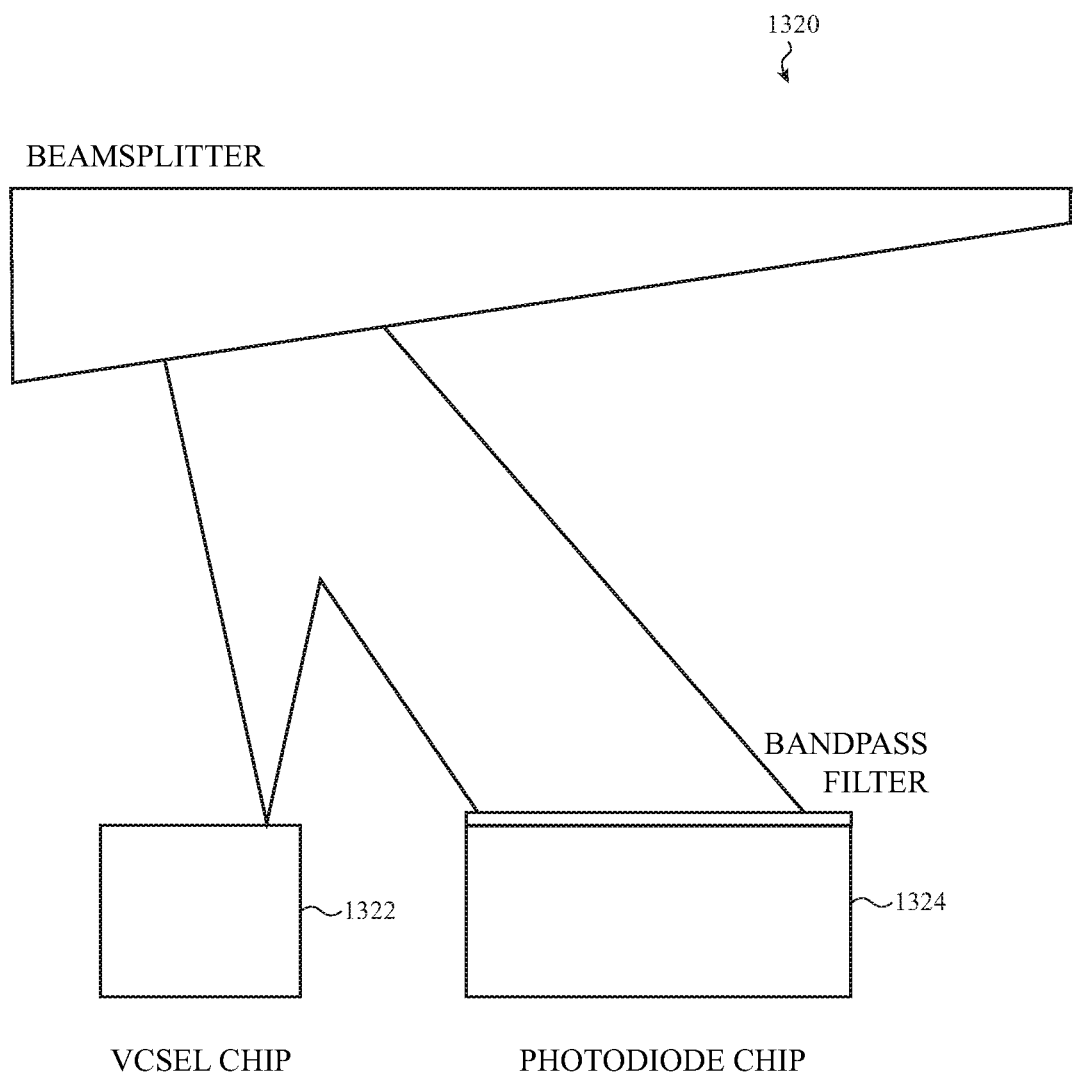

FIG. 13C shows a third example SMI sensor 1320 that may be used in one or more of the systems, devices, or methods described with reference to FIGS. 1A-12. In this example, the SMI sensor 1320 may include a VCSEL 1322 with an extrinsic off-chip photodetector 1324.

Figure 13D:
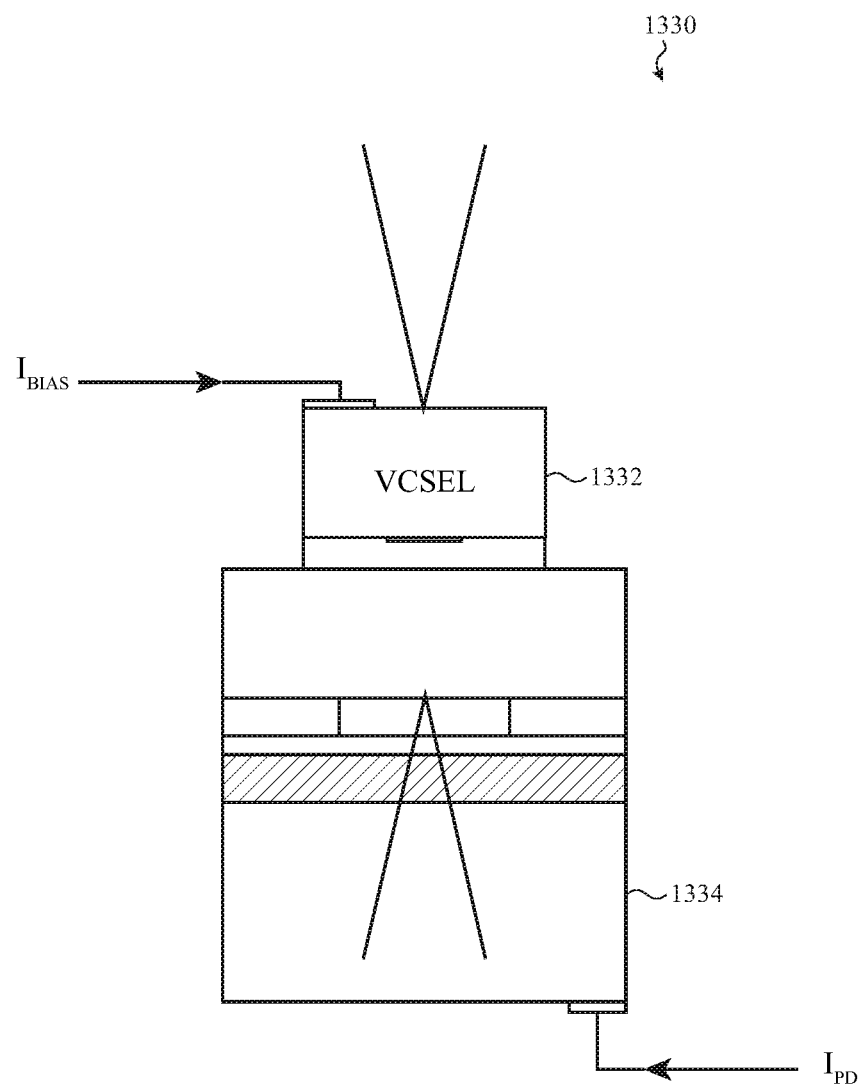

FIG. 13D shows a fourth example SMI sensor 1330 that may be used in one or more of the systems, devices, or methods described with reference to FIGS. 1A-12. In this example, the SMI sensor 1330 may include a dual-emitting VCSEL 1332 with an extrinsic off-chip photodetector 1334. For example, the top emission may be emitted towards optics and/or another target and the bottom emission may be provided to the extrinsic off-chip photodetector 1334.

Figure 14:
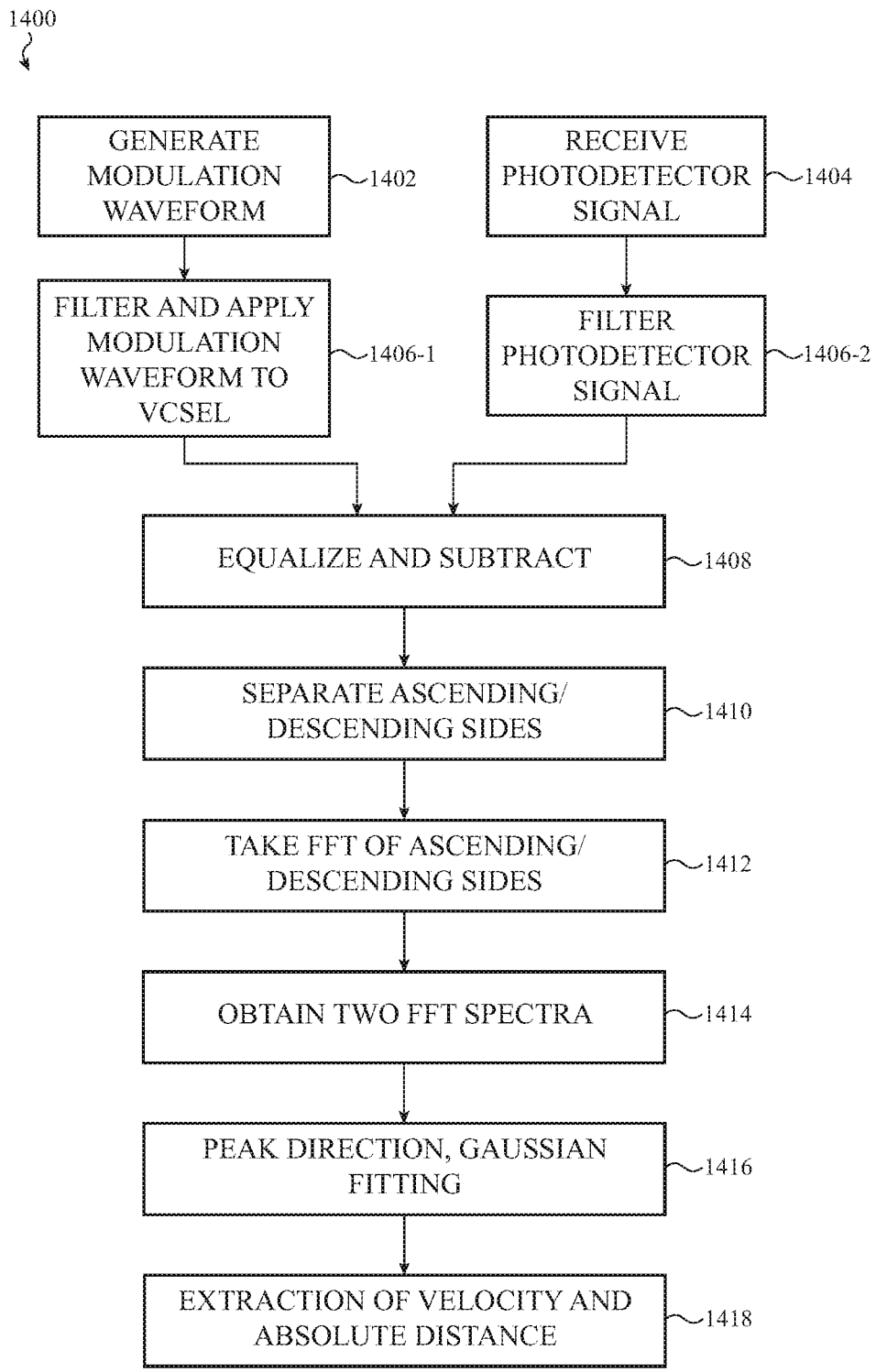
FIG. 14 shows a triangular bias procedure for determining velocity and absolute distance of a surface (or object) using self-mixing interferometry.

FIG. 14 shows a triangular bias (i.e., triangular modulation) procedure 1400 for determining velocity and absolute distance of a surface (or object) using self-mixing interferometry. The procedure 1400 may be used by one or more of the systems, devices, or methods described with reference to FIGS. 1A-12, to modulate an SMI sensor using a triangular waveform.

At an initial stage 1402, an initial signal is generated, such as by a digital or analog signal generator. At stage 1406-1, the generated initial signal is processed as needed to produce the triangle waveform modulation current 1502 that is applied to a VCSEL (see FIG. 15). Stage 1406-1 can be, as needed, operations of a DAC (such as when the initial signal is an output of a digital step generator), low-pass filtering (such as to remove quantization noise from the DAC), and voltage-to-current conversion.

The application of the modulation current 1502 to the VCSEL induces an SMI output 1518 (i.e., a change in an interferometric property of the VCSEL). It will be assumed for simplicity of discussion that the SMI output 1518 is from a photodetector, but in other embodiments it may be from another component.

At initial stage 1404 in FIG. 14, the SMI output 1518 is received. At stage 1406-2, initial processing of the SMI output 1518 is performed as needed. Stage 1406-2 may include high-pass filtering or digital subtraction.

At stage 1408, a processor may equalize the received signals in order to match their peak-to-peak values, mean values, root-mean-square values, or any other characteristic values, if necessary. For example the SMI output 1518 may be a predominant triangle waveform component being matched to the modulation current 1502, with a smaller and higher frequency component due to changes in the interferometric property. High-pass filtering may be applied to the SMI output 1518 to obtain the component signal related to the interferometric property. Also this stage may involve separating and/or subtracting the parts of the SMI output 1518 and the modulation current 1502 corresponding to the ascending and to the descending time intervals of the modulation current 1502. This stage may include sampling the separated information.

At stages 1410 and 1412, a separate fast Fourier transform (FFT) may be first performed on the parts of the processed SMI output 1518 corresponding to the ascending and to the descending time intervals. The two FFT spectra may be analyzed at stage 1414.

At stage 1416, the FFT spectra may be further processed, such as to remove artifacts and reduce noise. Such further processing can include peak detection and Gaussian fitting around the detected peak for increased frequency precision. From the processed FFT spectra data, information regarding the absolute distance can be obtained at stage 1418.

Figure 15:
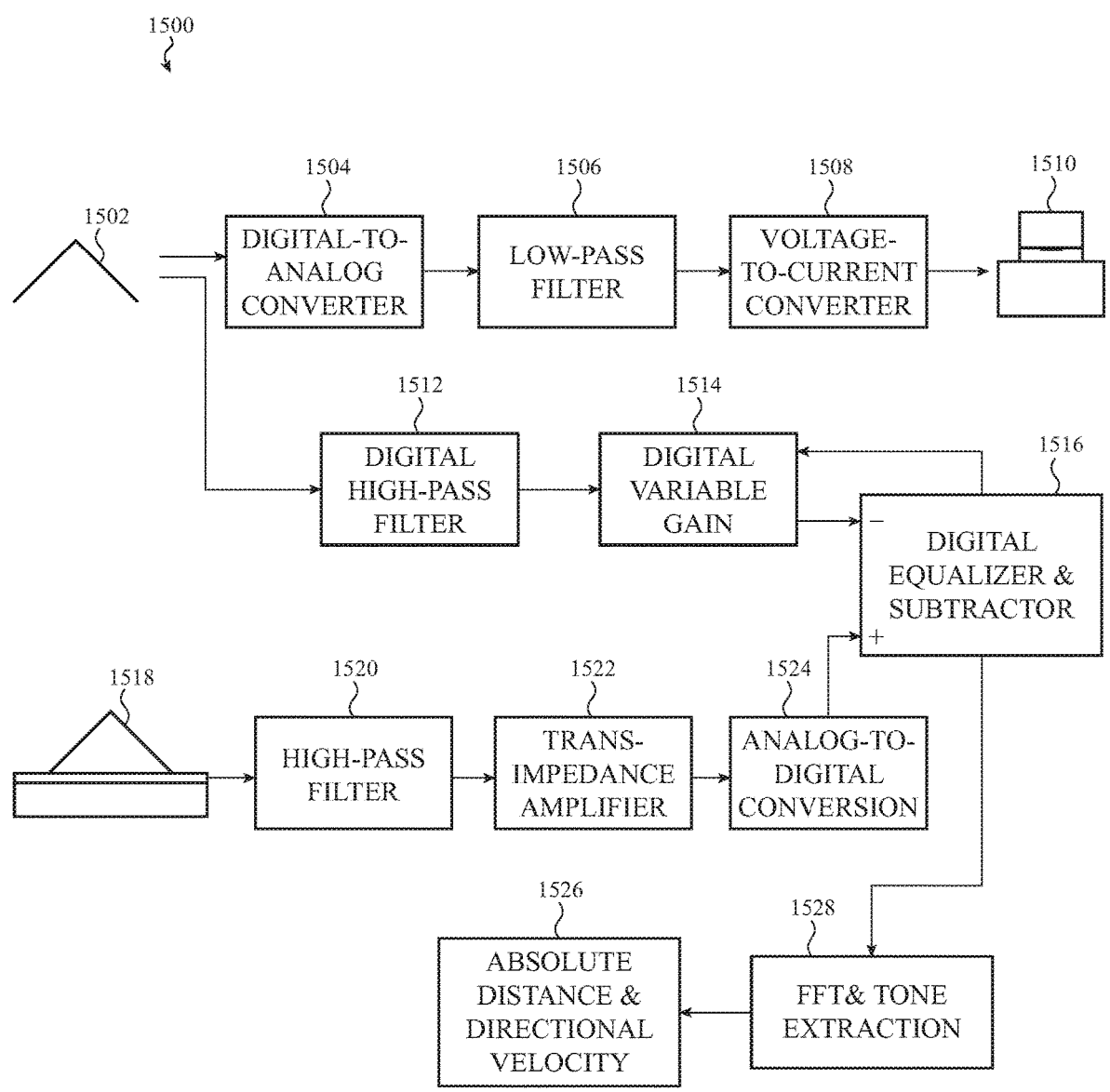
FIG. 15 depicts a block diagram of a system for implementing a spectrum analysis procedure using the procedure described with reference to FIG. 14.

FIG. 15 shows a block diagram of a system (e.g., part or all of the processor described with reference to FIGS. 1A-12) that may implement the spectrum analysis described in the method described above with respect to FIG. 14. In the exemplary system shown, the system includes generating an initial digital signal and processing it as needed to produce a modulation current 1502 as an input to the VCSEL 1510. In an illustrative example, an initial step signal may be produced by a digital generator to approximate a triangle function. The digital output values of the digital generator are used in the digital-to-analog converter (DAC) 1504. The resulting voltage signal may then be filtered by the low-pass filter 1506 to remove quantization noise. Alternatively, an analog signal generator based on an integrator can be used to generate an equivalent voltage signal directly. The filtered voltage signal then is an input to a voltage-to-current converter 1508 to produce the desired modulation current 1502 in a form for input to the VCSEL 1510.

As described above, movement of a target can cause changes in an interferometric parameter, such as a parameter of the VCSEL 1510 or of a photodetector operating in the system. The changes can be measured to produce an SMI output 1518. In the embodiment shown, it will be assumed the SMI output 1518 is measured by a photodetector. For the modulation current 1502 having the triangle waveform, the SMI output 1518 may be a triangle wave of a similar period combined with a smaller and higher frequency signal related to the interferometric property. In some cases, the SMI output 1518 may not be perfectly linear, even though the modulation current 1502 is linear. This may be a result of the bias current versus light output curve of the VCSEL 1510 being non-linear (e.g., due to non-idealities, such as self-heating effects).

The SMI output 1518 is first passed into the high-pass filter 1520, which can effectively convert the major ascending and descending ramp components of the SMI output 1518 to DC offsets. As the SMI output 1518 may typically be a current, the transimpedance amplifier 1522 can produce a corresponding voltage output (with or without amplification) for further processing.

The voltage output can then be sampled and quantized by the ADC block 1524. Before immediately applying a digital FFT to the output of the ADC block 1524, it can be helpful to apply equalization. The initial digital signal values from the digital generator used to produce the modulation current 1502 are used as input to the digital high-pass filter 1512 to produce a digital signal to correlate with the output of the ADC block 1524. An adjustable gain can be applied by the digital variable gain block 1514 to the output of the digital high-pass filter 1512.

The output of the digital variable gain block 1514 is used as one input to the digital equalizer and subtractor block 1516. The other input to the digital equalizer and subtractor block 1516 is the output of the ADC block 1524. The two signals are differenced, and used as part of a feedback to adjust the gain provided by the digital variable gain block 1514.

Equalization and subtraction may be used to clean up any remaining artifacts from the triangle that may be present in the SMI output 1518. For example, if there is a slope error or nonlinearity in the SMI output 1518, the digital high-pass filter 1512 may not fully eliminate the triangle and artifacts may remain. In such a situation, these artifacts may show up as low frequency components after the FFT and make the peak detection difficult for nearby objects. Applying equalization and subtraction may partially or fully remove these artifacts.

Once an optimal correlation is obtained by the feedback, an FFT, indicated by block 1528, can then be applied to the components of the output of the ADC block 1524 corresponding to the rising and descending side of the triangle wave. From the FFT spectra obtained, absolute distance and/or directional velocity may be inferred using the detected peak frequencies on the rising and descending sides, as discussed above and indicated by block 1526.

The method just described, and its variations, involve applying a spectrum analysis to an SMI output. However, it is understood that this is an example. In other implementations, alternate methods for determining absolute distances may be obtained directly from a time domain SMI output, without applying a spectrum analysis. Various configurations are possible and contemplated without departing from the scope of the present disclosure.

Figure 16:
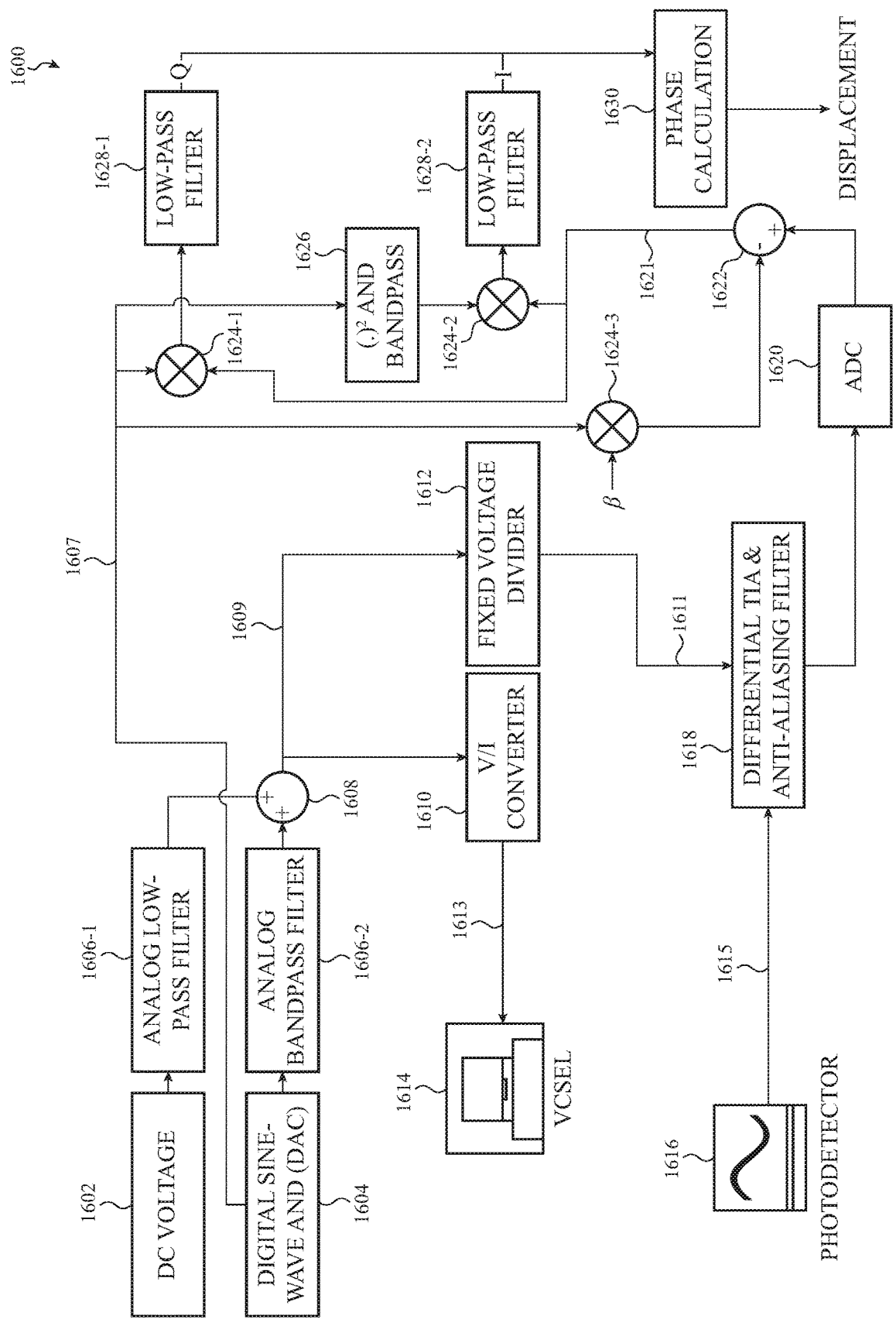
FIG. 16 shows a sinusoidal bias procedure for determining displacement of a surface (or object) using quadrature demodulation with self-mixing interferometry.

FIG. 16 shows a sinusoidal bias (i.e., sinusoidal modulation) procedure 1600 for determining displacement or movement of a surface (or object) using quadrature demodulation with self-mixing interferometry. The procedure 1600 may be used by one or more of the systems, devices, or methods described with reference to FIGS. 1A-12, to modulate an SMI sensor using a sinusoidal waveform.

As explained in more detail below, FIG. 16 shows components which generate and apply a sinusoidally modulated bias current to a VCSEL. The sinusoidal bias current can generate in a photodetector 1616 an output current depending on the frequency of the sinusoidal bias and the displacement to the structural component of the device. In the circuit of FIG. 16, the photodetector's 1616 output current is digitally sampled and then multiplied with a first sinusoid at the frequency of the original sinusoidal modulation of the bias current, and a second sinusoid at double that original frequency. The two separate multiplied outputs are then each low-pass filtered and the phase of the interferometric parameter may be calculated. Thereafter the displacement is determined using at least the phase.

The DC voltage generator 1602 is used to generate a constant bias voltage. A sine wave generator 1604 may produce an approximately single frequency sinusoid signal, to be combined with constant voltage. As shown in FIG. 16, the sine wave generator 1604 is a digital generator, though in other implementations it may produce an analog sine wave. The low-pass filter 1606-1 provides filtering of the output of the DC voltage generator 1602 to reduce undesired varying of the constant bias voltage. The bandpass filter 1606-2 can be used to reduce distortion and noise in the output of the sine wave generator 1604 to reduce noise, quantization or other distortions, or frequency components of its signal away from its intended modulation frequency, $\omega_m$.

The circuit adder 1608 combines the low-pass filtered constant bias voltage and the bandpass filtered sine wave to produce on link 1609 a combined voltage signal which, in the embodiment of FIG. 16, has the form $V_0+V_m \sin(\omega_m t)$. This voltage signal is used as an input to the voltage-to-current converter 1610 to produce a current to drive the lasing action of the VCSEL 1614. The current from the voltage-to-current converter 1610 on the line 1613 can have the form $I_0+I_m \sin(\omega_m t)$.

The VCSEL 1614 is thus driven to emit a laser light modulated as described above. Reflections of the modulated laser light may then be received back within the lasing cavity of VCSEL 1614 and cause self-mixing interference. The resulting emitted optical power of the VCSEL 1614 may be modified due to self-mixing interference, and this modification can be detected by the photodetector 1616. As described above, in such cases the photocurrent output of the photodetector 1616 on the link 1615 can have the form: $i_{PD}=i_0+i_m \sin(\omega_m t)+\gamma \cos(\varphi_0+\varphi_m \sin(\omega_m t))$. As the I/Q components to be used in subsequent stages are based on just the third term, the first two terms can be removed or reduced by the differential transimpedance amplifier and anti-aliasing (DTIA/AA) filter 1618. To do such a removal/reduction, a proportional or scaled value of the first two terms is produced by the voltage divider 1612. The voltage divider 1612 can use as input the combined voltage signal on the link 1609 produced by the circuit adder 1608. The output of the voltage divider 1612 on link 1611 can then have the form: $\alpha (qV_0+V_m \sin(\omega_m t))$. The photodetector current and this output of the voltage divider 1612 can be the inputs to the DTIA/AA filter 1618. The output of the DTIA/AA filter 1618 can then be, at least mostly, proportional to the third term of the photodetector current.

The output of the DTIA/AA filter 1618 may then be quantized for subsequent calculation by the ADC block 1620. Further, the output of the ADC block 1620 may have a residual signal component proportional to the sine wave originally generated by the sine wave generator 1604. To filter this residual signal component, the originally generated sine wave can be scaled (such as by the indicated factor of $\beta$) at multiplier block 1624-3, and then subtracted from the output of ADC block 1620 at subtraction block 1622. The filtered output on link 1621 may have the form: $A+B \sin(\omega_m t)+C \cos(2\omega_m t)+D \sin(3\omega_m t)+\ldots$, from the Fourier expansion of the $\gamma \cos(\varphi_0+\varphi_m \sin(\omega_m t))$ term discussed above. The filtered output can then be used for extraction of the I/Q components by mixing.

The digital sine wave originally generated by sine wave generator 1604 onto link 1607 is mixed (multiplied) by the multiplier block 1624-1 with the filtered output on link 1621. This product is then low-pass filtered at block 1628-1 to obtain the Q component discussed above, possibly after scaling with a number that is related to the amount of frequency modulation of the laser light and distance to the target.

Also, the originally generated digital sine wave is used as input into the squaring/filtering block 1626 to produce a digital cosine wave at a frequency double that of the originally produced digital sine wave. The digital cosine wave is then mixed (multiplied) at the multiplier block 1624-2 with the filtered output of the ADC block 1620 on link 1621. This product is then low-pass filtered at block 1628-2 to obtain the I component discussed above, possibly after scaling with a number that is related to the amount of frequency modulation of the laser light and distance to the target.

The Q and the I components are then used by the phase calculation component 1630 to obtain the phase from which the displacement of the target can be calculated, as discussed above.

One skilled in the art will appreciate that while the embodiment shown in FIG. 16 makes use of the digital form of the originally generated sine wave produced by sine wave generator 1604 onto link 1607, in other embodiments the originally generated sine wave may be an analog signal and mixed with an analog output of the DTIA/AA filter 1618. In other embodiments, the voltage divider 1612 may be a variable voltage divider. In still other embodiments, the voltage divider 1612 may be omitted and the DTIA/AA filter 1618 may be a single-ended DTIA/AA filter. In such embodiments, subtraction may be done only digitally at subtraction block 1622. In yet other embodiments, the subtraction block 1622 may be omitted and no subtraction of the modulation current may be performed.

The circuit of FIG. 16 can be adapted to implement the modified I/Q method described above that uses Q' $\propto \text{Lowpass}\{I_{PD} \times \sin(3\omega_m t)\}$. Some such circuit adaptations can include directly generating both mixing signals $\sin(2\omega_m t)$ and $\sin(3\omega_m t)$, and multiplying each with the output of the ADC block 1620, and then applying respective low-pass filtering, such as by the blocks 1628-1, 1628-2. The differential TIA and anti-aliasing filter 1618 may then be replaced by a filter to remove or greatly reduce the entire component of $I_{PD}$ at the original modulation frequency $\omega_m$. One skilled in the art will recognize other circuit adaptations for implementing this modified I/Q method. For example, the signal $\sin(3\omega_m t)$ may be generated by multiplying link 1607 and the output of squaring/filtering block 1626, and subsequently performing bandpass filtering to reject frequency components other than $\sin(3\omega_m t)$.

In additional and/or alternative embodiments, the I/Q time domain based methods just described may be used with the spectrum based methods of the first family of embodiments. The spectrum methods of the first family can be used at certain times to determine the absolute distance to the target, and provide a value of $L_0$. Thereafter, during subsequent time intervals, any of the various I/Q methods just described may be used to determine $\Delta L$.

In additional and/or alternative embodiments, the spectrum methods based on triangle wave modulation of a bias current of a VCSEL may be used as a guide for the I/Q time domain methods. The I/Q methods operate optimally in the case that $J_1(b)=J_2(b)$, so that the I and Q components have the same amplitude. However, b depends on the distance L. An embodiment may apply a triangle wave modulation to the VCSEL's bias current to determine a distance to a point of interest. Then this distance is used to find the optimal peak-to-peak sinusoidal modulation of the bias current to use in an I/Q approach. Such a dual method approach may provide improved signal-to-noise ratio and displacement accuracy obtained from the I/Q method.

In some cases, the modulation of an SMI sensor's current or junction voltage may be warped (e.g., modulated with an irregular triangular or sinusoidal signal) so that a beam of electromagnetic radiation produced by the SMI sensor is appropriately modulated (e.g., triangularly or sinusoidally modulated). Warping the modulation of an SMI sensor's current or junction voltage may involve emitting a beam of electromagnetic radiation toward an object; rate-correcting an SMI signal generated by the SMI sensor based on the zero-crossings of the SMI signal; and optimizing a modulation waveform for the SMI sensor's current or junction voltage such that an expected SMI signal is produced.

Figure 17:
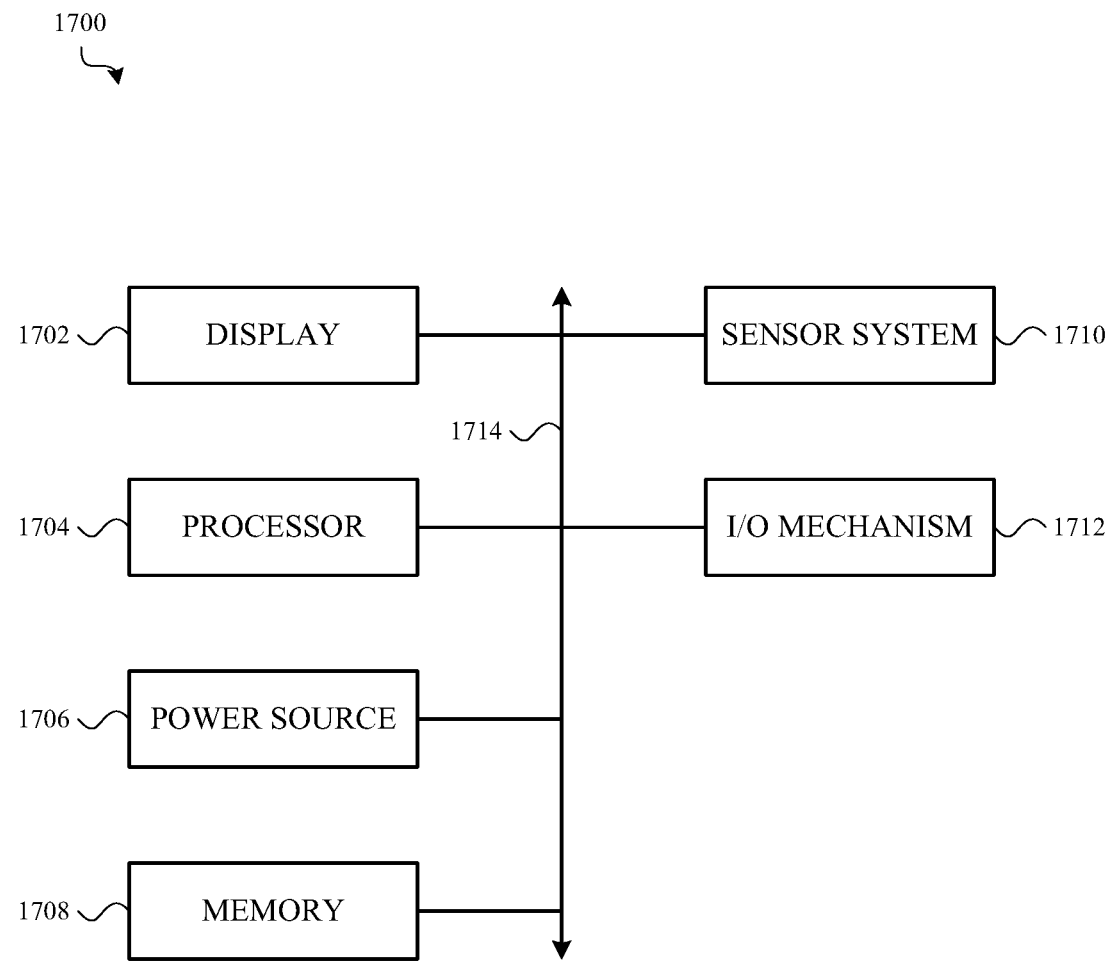
FIG. 17 shows an example electrical block diagram of an electronic device.

FIG. 17 shows a sample electrical block diagram of an electronic device 1700, which electronic device may in some cases be implemented as any of the devices described with reference to FIGS. 1A-1C, 2, 6, and 7. The electronic device 1700 may include an electronic display 1702 (e.g., a light-emitting display), a processor 1704, a power source 1706, a memory 1708 or storage device, a sensor system 1710, or an input/output (I/O) mechanism 1712 (e.g., an input/output device, input/output port, or haptic input/output interface). The processor 1704 may control some or all of the operations of the electronic device 1700. The processor 1704 may communicate, either directly or indirectly, with some or all of the other components of the electronic device 1700. For example, a system bus or other communication mechanism 1714 can provide communication between the electronic display 1702, the processor 1704, the power source 1706, the memory 1708, the sensor system 1710, and the I/O mechanism 1712.

The processor 1704 may be implemented as any electronic device capable of processing, receiving, or transmitting data or instructions, whether such data or instructions is in the form of software or firmware or otherwise encoded. For example, the processor 1704 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 1704 may provide part or all of the processor described with reference to any of FIGS. 1A-12.

It should be noted that the components of the electronic device 1700 can be controlled by multiple processors. For example, select components of the electronic device 1700 (e.g., the sensor system 1710) may be controlled by a first processor and other components of the electronic device 1700 (e.g., the electronic display 1702) may be controlled by a second processor, where the first and second processors may or may not be in communication with each other.

The power source 1706 can be implemented with any device capable of providing energy to the electronic device 1700. For example, the power source 1706 may include one or more batteries or rechargeable batteries. Additionally or alternatively, the power source 1706 may include a power connector or power cord that connects the electronic device 1700 to another power source, such as a wall outlet.

The memory 1708 may store electronic data that can be used by the electronic device 1700. For example, the memory 1708 may store electrical data or content such as, for example, audio and video files, documents and applications, device settings and user preferences, timing signals, control signals, and data structures or databases. The memory 1708 may include any type of memory. By way of example only, the memory 1708 may include random access memory, read-only memory, Flash memory, removable memory, other types of storage elements, or combinations of such memory types.

The electronic device 1700 may also include one or more sensor systems 1710 positioned almost anywhere on the electronic device 1700. In some cases, the sensor systems 1710 may include one or more SMI sensors, positioned as described with reference to any of FIGS. 1A-12. The sensor system(s) 1710 may be configured to sense one or more types of parameters, such as but not limited to, vibration; light; touch; force; heat; movement; relative motion; biometric data (e.g., biological parameters) of a user; air quality; proximity; position; connectedness; and so on. By way of example, the sensor system(s) 1710 may include an SMI sensor, a heat sensor, a position sensor, a light or optical sensor, an accelerometer, a pressure transducer, a gyroscope, a magnetometer, a health monitoring sensor, and an air quality sensor, and so on. Additionally, the one or more sensor systems 1710 may utilize any suitable sensing technology, including, but not limited to, interferometric, magnetic, capacitive, ultrasonic, resistive, optical, acoustic, piezoelectric, or thermal technologies.

The I/O mechanism 1712 may transmit or receive data from a user or another electronic device. The I/O mechanism 1712 may include the electronic display 1702, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1712 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:
1. A device, comprising:
    a frame;
    an optical element attached to the frame and having a known optical thickness between a first surface and a second surface of the optical element;
    an SMI sensor attached to the frame and configured to, emit a modulated beam of electromagnetic radiation toward the first surface of the optical element; and generate an SMI signal containing disturbances caused by reflections or backscatters of the modulated beam of electromagnetic radiation from the first surface and the second surface; and a processor configured to, relate the disturbances to the known optical thickness of the optical element; and determine a distance between two objects using the SMI signal and the relationship of the disturbances to the known optical thickness of the optical element.

2. The device of claim 1, wherein the modulated beam of electromagnetic radiation is triangularly modulated.

3. The device of claim 1, wherein the optical element comprises an optical film.

4. The device of claim 1, wherein:

the optical element has a known refractive index; and the processor is configured to relate the disturbances to the known optical thickness by, relating the disturbances to a known physical thickness of the optical element using at least the known refractive index of the optical element.

5. The device of claim 1, further comprising:

a display; wherein, the optical element comprises a cover;

the frame and the cover at least partly define an interior volume of the device; and the display is housed within the interior volume and viewable through the cover.

6. The device of claim 1, further comprising:

a display; and a cover attached to the frame; wherein, the frame and the cover at least partly define an interior volume of the device;

the display is housed within the interior volume and viewable through the cover; and the optical element is attached to an interior surface of the cover.

7. The device of claim 1, further comprising:

a display housed within the frame; wherein, the optical element is disposed to one side of a viewing surface of the display, with the first and second surfaces of the optical element oriented parallel to the viewing surface of the display.

8. A device, comprising:

a first component;

a second component having a reconfigurable distance from the first component;

an optical element having a fixed relationship with respect to the first component, and having a known optical thickness between a first surface and a second surface of the optical element;

an SMI sensor having a fixed relationship with respect to the second component, and having an electromagnetic radiation emission axis that intersects the first and second surfaces of the optical element;

a processor configured to, identify disturbances in an SMI signal generated by the SMI sensor;

relate the disturbances to the known optical thickness of the optical element; and determine a distance between the first and second components using the SMI signal and the relationship of the disturbances to the known optical thickness of the optical element.

9. The device of claim 8, wherein the disturbances comprise frequency components, and magnitudes of the frequency components, in a fast Fourier transform (FFT) of at least part of the SMI signal.

10. The device of claim 8, wherein the optical element comprises an optical film.

11. The device of claim 8, wherein at least one of the first component or the second component comprises a lens.

12. The device of claim 8, wherein one of the first component or the second component comprises a frame component and the other of the first component or the second component comprises a lens.

13. The device of claim 8, wherein one of the first component or the second component comprises an image sensor, and the other of the first component or the second component comprises a lens.

14. The device of claim 8, further comprising:

a motor; wherein, the determined distance between the first component and the second component is a first distance;

the processor is configured to;

adjust the distance between the first component and the second component by operating the motor; and after adjusting the distance between the first component and the second component, determine a second distance between the first component and the second component using the SMI signal and the relationship of the disturbances to the known optical thickness of the optical element.

15. The device of claim 14, wherein the processor is configured to:

when the first and second components are separated by the first distance, triangularly modulate electromagnetic radiation of the SMI sensor;

obtain a first set of samples of the SMI signal while the electromagnetic radiation is triangularly modulated; and use the obtained first set of samples to identify the disturbances in the SMI signal, and to determine the distance between the first and second components.

16. The device of claim 15, wherein the processor is further configured to:

after obtaining the first set of samples, switch a modulation of the electromagnetic radiation to a sinusoidal modulation;

adjust the distance between the first and second components while the electromagnetic radiation is sinusoidally modulated, from the first distance to the second distance;

obtain a second set of samples of the SMI signal while the distance between the first and second components is being adjusted;

switch the modulation of the electromagnetic radiation to a triangular modulation before determining the second distance between the first and second components; and determine a wavelength of the electromagnetic radiation using the first distance, the second distance, and the second set of samples.

17. The device of claim 8, wherein a beam of electromagnetic radiation emitted by the SMI sensor is triangularly modulated.

18. A method of determining a distance between a first object and a second object, comprising:

emitting a beam of electromagnetic radiation from an SMI sensor having a fixed relationship with respect to the first object;

receiving, from the SMI sensor, an SMI signal containing disturbances caused by reflections or backscatters of the beam of electromagnetic radiation from first and second surfaces of an optical element having a fixed relationship with respect to the second object;

relating the disturbances to a known optical thickness of the optical element; and determining a distance between the first object and the second object, using the SMI signal and the relationship of the disturbances to the known optical thickness of the optical element.

19. The method of claim 18, further comprising:

while the first and second objects are stationary with respect to each other, triangularly modulating the beam of electromagnetic radiation; and obtaining a first set of samples of the SMI signal while the beam of electromagnetic radiation is triangularly modulated; and identifying the disturbances within the first set of samples.

20. The method of claim 19, wherein the distance between the first object and the second object is a first distance, the method further comprising:

after obtaining the first set of samples, switching a modulation of the beam of electromagnetic radiation to a sinusoidal modulation;

adjusting the distance between the first object and the second object, from the first distance to a second distance, while the beam of electromagnetic radiation is sinusoidally modulated; and obtaining a second set of samples of the SMI signal while the distance between the first object and the second object is being adjusted from the first distance to the second distance;

after the distance between the first object and the second object is adjusted to the second distance, switching the modulation of the wavelength of the beam of electromagnetic radiation to the triangular modulation; and determining the second distance using the SMI signal and the known optical thickness; and determining the wavelength of the beam of electromagnetic radiation using the first distance, the second distance, and the second set of samples.

* * * * *